US012713109B2

(12) United States Patent
Hu et al.

(10) Patent No.: US 12,713,109 B2
(45) Date of Patent: Aug. 18, 2026

(54) DATA PROCESSING FOR IMMERSIVE MEDIA

(71) Applicant: Tencent Technology (Shenzhen) Company Limited, Shenzhen (CN)

(72) Inventors: Ying Hu, Shenzhen (CN); Xiaozhong Xu, Shenzhen (CN); Shan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 400 days.

(21) Appl. No.: 17/715,854

(22) Filed: Apr. 7, 2022

(65) Prior Publication Data

US 2022/0239992 A1 Jul. 28, 2022

Related U.S. Application Data

(63) Continuation of application No. PCT/CN2021/084179, filed on Mar. 30, 2021.

(30) Foreign Application Priority Data

Jun. 4, 2020 (CN) ........................ 202010501593.5

(51) Int. Cl.
*H04N 21/4728* (2011.01)
*H04N 19/597* (2014.01)
(Continued)

(52) U.S. Cl.
CPC ......... *H04N 21/816* (2013.01); *H04N 19/597* (2014.11); *H04N 21/440245* (2013.01);
(Continued)

(58) Field of Classification Search
CPC ............... H04N 21/816; H04N 19/597; H04N 21/440245; H04N 21/4728; H04N 13/10;
(Continued)

(56) References Cited

U.S. PATENT DOCUMENTS

| | | | | |
|---|---|---|---|---|
| 2010/0039535 A1* | 2/2010 | Maeda | ................. | H04N 23/667 348/240.2 |
| 2010/0321535 A1* | 12/2010 | Rodriguez | ............. | H04N 23/80 348/E5.051 |

(Continued)

FOREIGN PATENT DOCUMENTS

| | | |
|---|---|---|
| CN | 103026721 A | 4/2013 |
| CN | 105933726 A | 9/2016 |

(Continued)

OTHER PUBLICATIONS

Chinese Office Action for corresponding CN202010501593.5, issued Mar. 30, 2022, 16 pages, English translation provided.

(Continued)

*Primary Examiner* — Jamie J Atala
*Assistant Examiner* — Mahmoud Kamal Abouzahra
(74) *Attorney, Agent, or Firm* — ARENTFOX SCHIFF LLP

(57) ABSTRACT

In a data processing method for immersive media, metadata of the immersive media is obtained. The metadata includes (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled. Zoom processing is performed on the zoom region of the immersive media according to the zoom mode information included in the metadata when the zoom mode information indicates that the target zoom mode is enabled for the zoom region. Apparatus and non-transitory computer-readable storage medium counterpart embodiments are also contemplated.

20 Claims, 8 Drawing Sheets

(51) Int. Cl.

| | |
|---|---|
| ***H04N 21/4402*** | (2011.01) |
| ***H04N 21/81*** | (2011.01) |
| *H04N 13/10* | (2018.01) |
| *H04N 13/117* | (2018.01) |

(52) U.S. Cl.
CPC ......... *H04N 21/4728* (2013.01); *H04N 13/10* (2018.05); *H04N 13/117* (2018.05)

(58) Field of Classification Search
CPC ........... H04N 13/117; H04N 21/85406; H04N 19/70; H04N 21/234; H04N 21/234363; H04N 21/44; H04N 21/440263; H04N 21/84
USPC ........................................................... 348/43
See application file for complete search history.

(56) References Cited

U.S. PATENT DOCUMENTS

| | | | | |
|---|---|---|---|---|
| 2017/0339399 | A1 | 11/2017 | Hoffman et al. | |
| 2018/0262708 | A1* | 9/2018 | Lee ...................... | H04N 21/475 |
| 2019/0385372 | A1 | 12/2019 | Cartwright et al. | |
| 2020/0007856 | A1 | 1/2020 | Hoffman et al. | |
| 2020/0169754 | A1* | 5/2020 | Wang ................... | H04N 13/122 |
| 2022/0014786 | A1* | 1/2022 | Huang ................. | H04N 19/167 |

FOREIGN PATENT DOCUMENTS

| | | | |
|---|---|---|---|
| CN | 107005741 | A | 8/2017 |
| CN | 108141529 | A | 6/2018 |
| CN | 108702522 | A | 10/2018 |
| CN | 108965847 | A | 12/2018 |
| CN | 110121885 | A | 8/2019 |
| CN | 110351492 | A | 10/2019 |
| CN | 110488967 | A | 11/2019 |
| CN | 110870303 | A | 3/2020 |
| CN | 111226189 | A | 6/2020 |
| EP | 4009644 | A1 | 6/2022 |
| WO | 2019192321 | A1 | 10/2019 |
| WO | 2020/064733 | A1 | 4/2020 |

OTHER PUBLICATIONS

M. F. Syawaludin, C. Kim and J.-I. Hwana, "Hybrid Camera System for Telepresence with Foveated Imaging," 2019 IEEE Conference on Virtual Reality and 3D User Interfaces (VR), 2019, pp. 1173-1174, doi: 10.1109/VR.2019.8798011.

Lu Li, "Virtual Reality Technology Applications in the Art of Urban Planning", China Master's Theses Full-text Database, Jun. 15, 2014, 55 pages, with English Abstract.

Liang Weng, "Application of Virtual Reality Technology in Textile CAD", China Master's Theses Full-text Database, Jun. 15, 2009, 96 pages, with English Abstract.

International Search Report and Written Opinion for PCT/CN2021/084179, issued Jul. 7, 2021, 12 pages, English translation included.

Supplemental European Search Report for corresponding 21817039.7, issued Nov. 18, 2022, 11 pages.

Cheng Huang et al: "[OMAF] Support of spherical zooming for omnidirectional video", 122. MPEG Meeting; Apr. 16, 2018-Apr. 20, 2018; San Diego; (Motion Picture Expert Group or ISO/IEC JTC1/SC29/WG11), No. m42490, Apr. 18, 2018, pp. 1-6.

Office Action received for Chinese Patent Application No. 202310303774.0, mailed on Jan. 22, 2026, 28 pages (Official copy and Machine Translation).

* cited by examiner

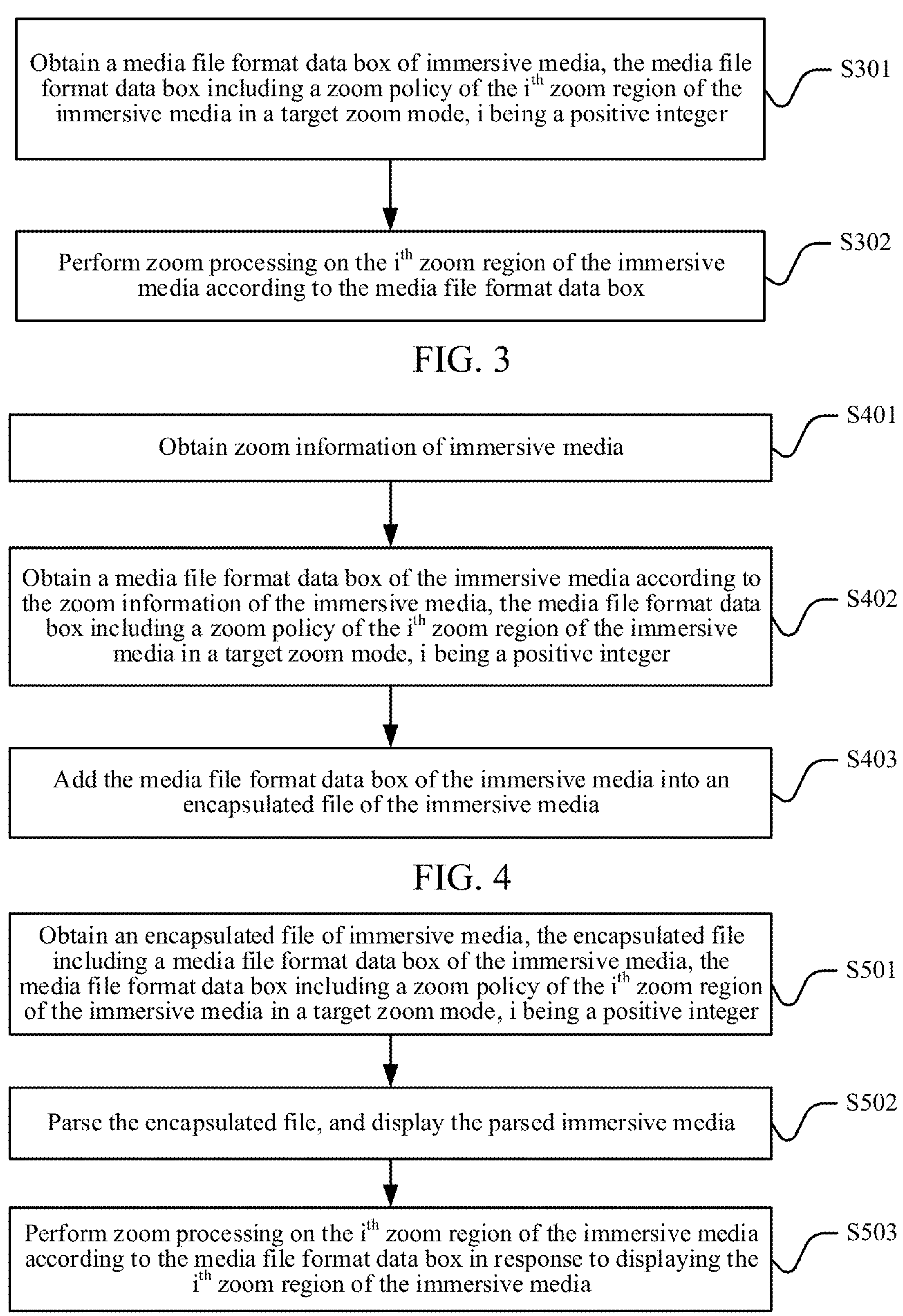
Obtain a media file format data box of immersive media, the media file format data box including a zoom policy of the i^th zoom region of the immersive media in a target zoom mode, i being a positive integer
S301
Perform zoom processing on the i^th zoom region of the immersive media according to the media file format data box
S302
FIG. 3
Obtain zoom information of immersive media
S401
Obtain a media file format data box of the immersive media according to the zoom information of the immersive media, the media file format data box including a zoom policy of the i^th zoom region of the immersive media in a target zoom mode, i being a positive integer
S402
Add the media file format data box of the immersive media into an encapsulated file of the immersive media
S403
FIG. 4
Obtain an encapsulated file of immersive media, the encapsulated file including a media file format data box of the immersive media, the media file format data box including a zoom policy of the i^th zoom region of the immersive media in a target zoom mode, i being a positive integer
S501
Parse the encapsulated file, and display the parsed immersive media
S502
Perform zoom processing on the i^th zoom region of the immersive media according to the media file format data box in response to displaying the i^th zoom region of the immersive media
S503
FIG. 5

DATA PROCESSING FOR IMMERSIVE MEDIA

RELATED APPLICATIONS

This application is a continuation of International Application No. PCT/CN2021/084179 filed on Mar. 30, 2021, which claims priority to Chinese Patent Application No. 202010501593.5 filed on Jun. 4, 2020. The entire disclosures of the prior applications are hereby incorporated by reference in their entirety.

FIELD OF THE TECHNOLOGY

This application relates to the field of computer technologies and the field of virtual reality (VR) technologies.

BACKGROUND OF THE DISCLOSURE

In immersive media transmission solutions in the related art, user-initiated zooming of immersive media has been supported. For video content supporting zooming at a specific playback time in a specific screen region, a server may prepare videos of a plurality of zoom ratio versions for the region. When a user performs a zoom operation, a content playback device requests the videos of all the zoom ratio versions from the server. Finally, the user decides to present a video at a specific zoom ratio and in a specific resolution through a zoom behavior in some embodiments. However, the zoom behavior depends entirely on an actual zoom operation of the user. Because a zoom behavior of the user cannot be known in advance, before the user performs zooming, the content playback device needs to request videos in all zoom resolutions first, which inevitably causes bandwidth waste.

SUMMARY

Embodiments of this application includes data processing methods, apparatuses, and devices for immersive media, and non-transitory computer-readable storage mediums, for example to save the transmission bandwidth.

The embodiments of this application provide a data processing method for immersive media. In the data processing method, metadata of the immersive media is obtained. The metadata includes (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled. Zoom processing is performed on the zoom region of the immersive media according to the zoom mode information included in the metadata when the zoom mode information indicates that the target zoom mode is enabled for the zoom region.

The embodiments of this application further provide a data processing method for immersive media. In the data processing method, metadata of the immersive media is generated. The metadata includes (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled. The metadata of the immersive media is added into an encapsulated file of the immersive media.

The embodiments of this application provide a data processing apparatus for immersive media that includes processing circuitry. The processing circuitry is configured to obtain metadata of the immersive media. The metadata includes (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled. The processing circuitry is configured to perform processing on the zoom region of the immersive media according to the zoom mode information included in the metadata when the zoom mode information indicates that the target zoom mode is enabled for the zoom region.

The embodiments of this application provide another data processing apparatus for immersive media that includes processing circuitry. The processing circuitry is configured to generate metadata of the immersive media including (i) zoom region information of a zoom region of the immersive media, and (ii) zoom mode information that indicates whether a target zoom mode is enabled for the zoom region. The zoom mode information indicating zoom parameters of the target zoom mode for the zoom region when the target zoom mode is enabled. The processing circuitry is configured to add the metadata of the immersive media into an encapsulated file of the immersive media.

The embodiments of this application provide a data processing device for immersive media, including one or more processors and one or more memories, the one or more memories storing at least one segment of program code, the at least one segment of program code being loaded and executed by the one or more processors, to implement any of the data processing methods for immersive media.

The embodiments of this application further provide a non-transitory computer-readable storage medium, storing instructions which when executed by a processor cause the processor to perform any of the data processing methods for immersive media.

In the embodiments of this application, a media file format data box and a media presentation description file of immersive media are extended to support a target (director) zoom mode, so that a content production device can formulate different zoom policies at different resolutions for a user according to an intention of an immersive media content producer, and a client requests a corresponding video file from a server according to a zoom policy corresponding to a current resolution and consumes it. In view of the above, in the target zoom mode, the client does not need to request encapsulated files of all zoom resolution versions, thereby saving the transmission bandwidth. In addition, when the client consumes an encapsulated file corresponding to a target zoom mode at a current resolution, the client automatically presents, according to the target zoom mode, a zoom effect specified by an immersive media content producer, so that the user can obtain a best viewing experience.

BRIEF DESCRIPTION OF THE DRAWINGS

FIG. 3 is a flowchart of a data processing method for immersive media according to an embodiment of this disclosure.

FIG. 4 is a flowchart of another data processing method for immersive media according to an embodiment of this disclosure.

FIG. 5 is a flowchart of another data processing method for immersive media according to an embodiment of this disclosure.

DESCRIPTION OF EMBODIMENTS

Technical solutions in embodiments of this disclosure are described below with reference to the accompanying drawings in the embodiments of this disclosure. The described embodiments are merely some rather than all of the embodiments of this disclosure. Other embodiments are within the scope of this disclosure.

This disclosure includes embodiments related to a data processing technology for immersive media. The so-called immersive media can refer to a media file that can provide immersive media content, to enable a user immersed in the media content to obtain visual, auditory, and other sensory experience in the real world. In some embodiments, the immersive media may be three degrees of freedom (3DoF) immersive media, 3DoF+ immersive media, or 6DoF immersive media. The immersive media content includes video content represented in various forms in a three-dimensional (3D) space, for example, a 3D video content represented in a sphere form. In some embodiments, the immersive media content may be virtual reality (VR) video content, panoramic video content, sphere video content, or 360-degree video content. Therefore, the immersive media may also be referred to as a VR video, a panoramic video, a sphere video, or a 360-degree video. In addition, the immersive media content further includes audio content synchronized with the video content represented in the 3D space.

Figure 1A:
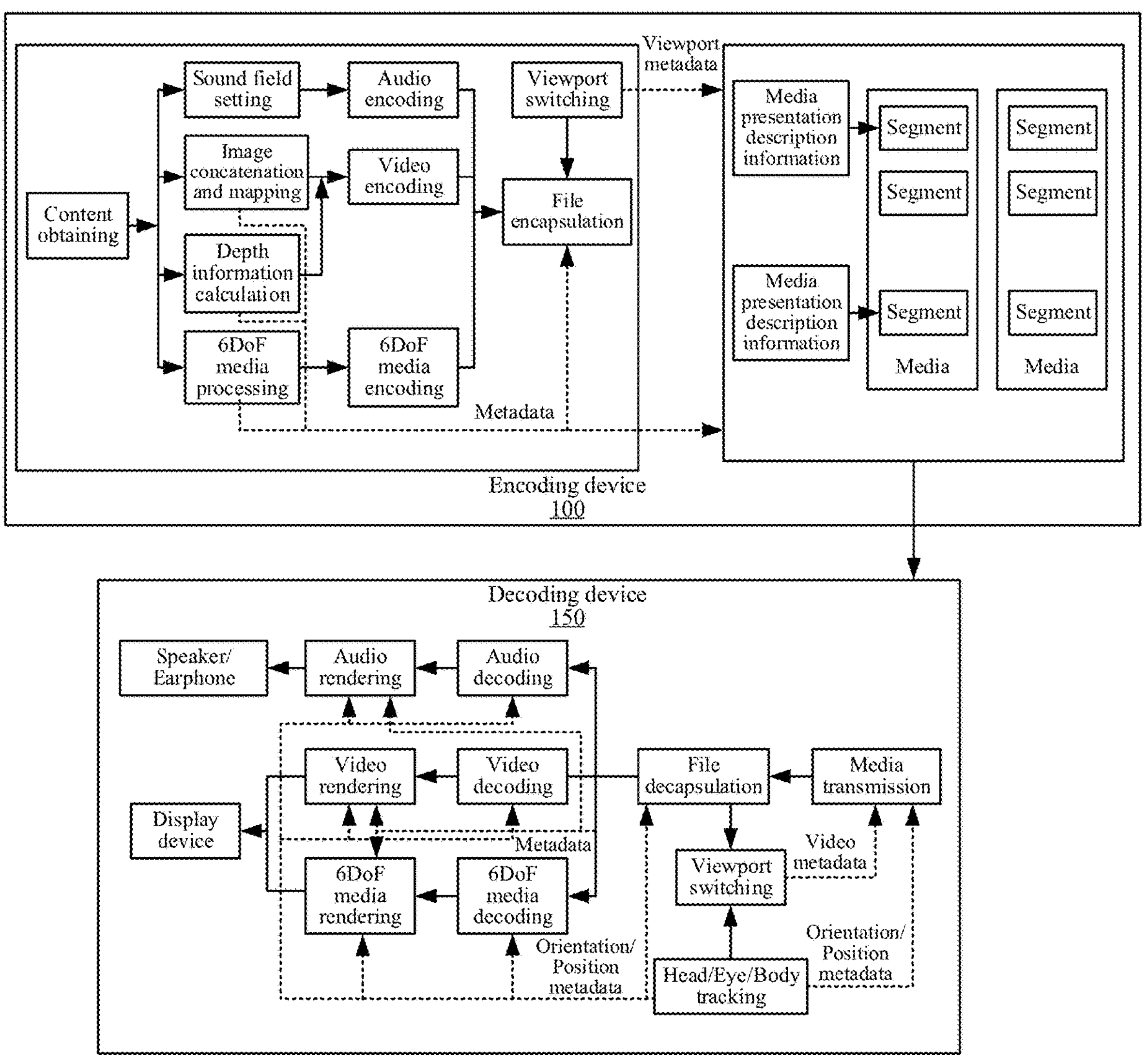
FIG. 1A is an architectural diagram of an immersive media system according to an embodiment of this disclosure.

FIG. 1A is an architectural diagram of an immersive media system according to an exemplary embodiment of this disclosure. As shown in FIG. 1A, the immersive media system includes a content production device and a content playback device. The content production device may include an encoding device 100 and be a computer device used by a provider of immersive media (e.g., a content producer of immersive media). The computer device may include a decoding device 150 and be a terminal (e.g., a personal computer (PC) or an intelligent mobile device (e.g., a smartphone)) or a server. The content playback device may be a computer device used by a user of immersive media (e.g., a user). The computer device may be a terminal (e.g., a PC, an intelligent mobile device (e.g., a smartphone), or a VR device (e.g., a VR helmet or VR glasses)). A data processing procedure for immersive media includes a data processing procedure on the side of the content production device and a data processing procedure on the side of the content playback device.

The data processing procedure on the side of the content production device mainly includes: (1) obtaining and producing procedures for media content of immersive media; and (2) encoding and file encapsulation procedures for the immersive media. The data processing procedure on the side of the content playback device mainly includes: (3) file decapsulation and decoding procedures for the immersive media; and (4) a rendering procedure for the immersive media. In addition, a transmission procedure of immersive media is involved between the content production device and the content playback device. The transmission procedure may be carried out based on various transmission protocols. The transmission protocol herein may include, but is not limited to, the Dynamic Adaptive Streaming over HTTP (DASH) protocol, the HTTP Live Streaming (HLS) protocol, the Smart Media Transport Protocol (SMTP), the Transmission Control Protocol (TCP), and the like.

The procedures involved in the data processing procedures for immersive media are respectively described below in detail.

Figure 1B:
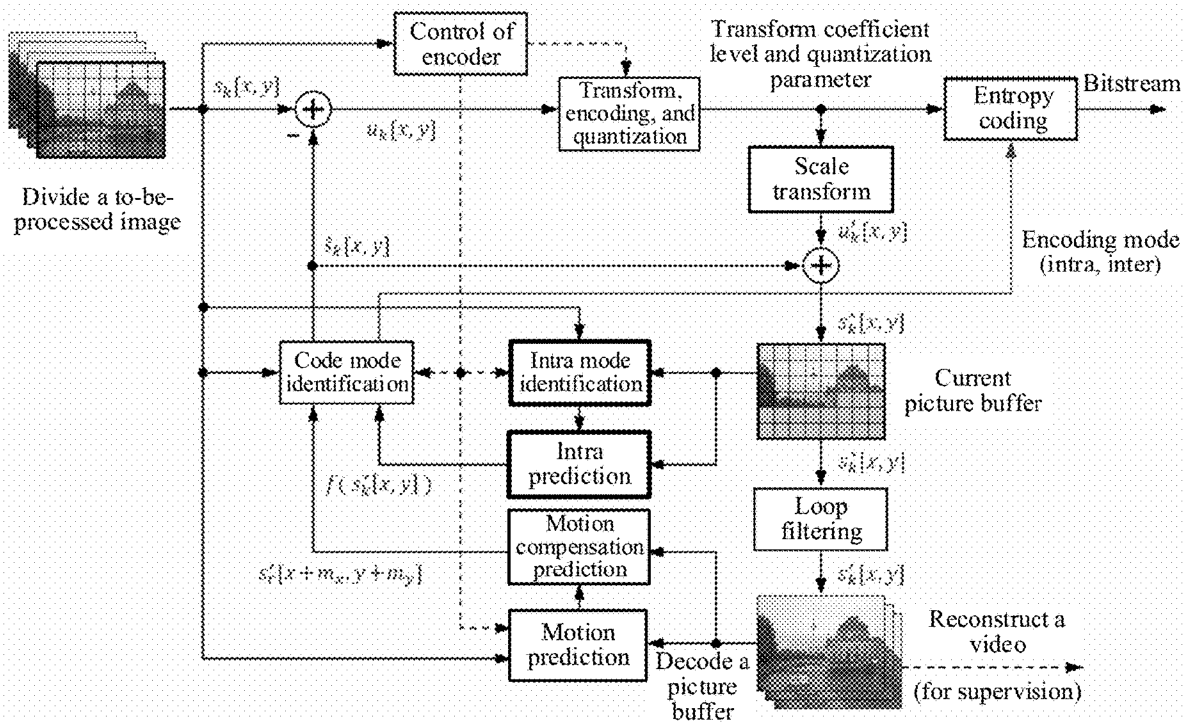
FIG. 1B is a basic block diagram of video encoding according to an embodiment of this disclosure.

FIG. 1B is a basic block diagram of video encoding according to an exemplary embodiment of this disclosure. The procedures involved in the data processing procedures for immersive media are described in detail with reference to FIG. 1A and FIG. 1B.

I. Data Processing Procedure on the Side of the Content Production Device (1) Obtaining of Media Content of Immersive Media Modes of obtaining media content of immersive media may be divided into two modes: obtaining the media content by acquiring an audio-visual scene of a real world through a capturing device and generating the media content through a computer. In some embodiments, the capturing device may refer to a hardware assembly disposed in the content production device. For example, the capturing device refers to a microphone, a camera, a sensor, or the like of the terminal. In some embodiments, the capturing device may alternatively be a hardware device connected to the content production device, for example, a camera connected to the server, and configured to provide a service of obtaining media content of immersive media for THE content production device. The capturing device may include, but is not limited to, an audio device, a camera device, and a sensing device. The audio device may include an audio sensor, a microphone, or the like. The camera device may include an ordinary camera, a stereo camera, a light field camera, or the like. The sensing device may include a laser device, a radar device, or the like. There may be a plurality of capturing devices. The capturing devices are deployed at some specific positions in a real space to simultaneously capture audio content and video content from different angles in the space. The captured audio content and video content are synchronized temporally and spatially. Due to the different obtaining modes, compression encoding modes corresponding to media content of different immersive media may also be different.

(2) Production Procedure of Media Content of Immersive Media

The captured audio content itself is content adapted to be audio-encoded for immersive media. Only after being subjected to a series of production procedures, the captured video content can become content adapted to be video-encoded for immersive media. The production procedures include:

(i) Concatenation. Because the captured video content is photographed by the capturing devices from different angles, concatenation can refer to concatenating the video content photographed from the angles into a complete 360-degree visual panoramic video capable of reflecting a real space. That is, the concatenated video can be a panoramic video (or a sphere video) represented in a 3D space.

(ii) Projection. Projection can refer to a procedure of mapping a concatenated 3D video onto a two-dimensional (2D) image. The 2D image formed through projection can be referred to as a projected image. A projection mode may include, but is not limited to, latitude and longitude map projection or regular hexahedron projection.

Figure 1C:
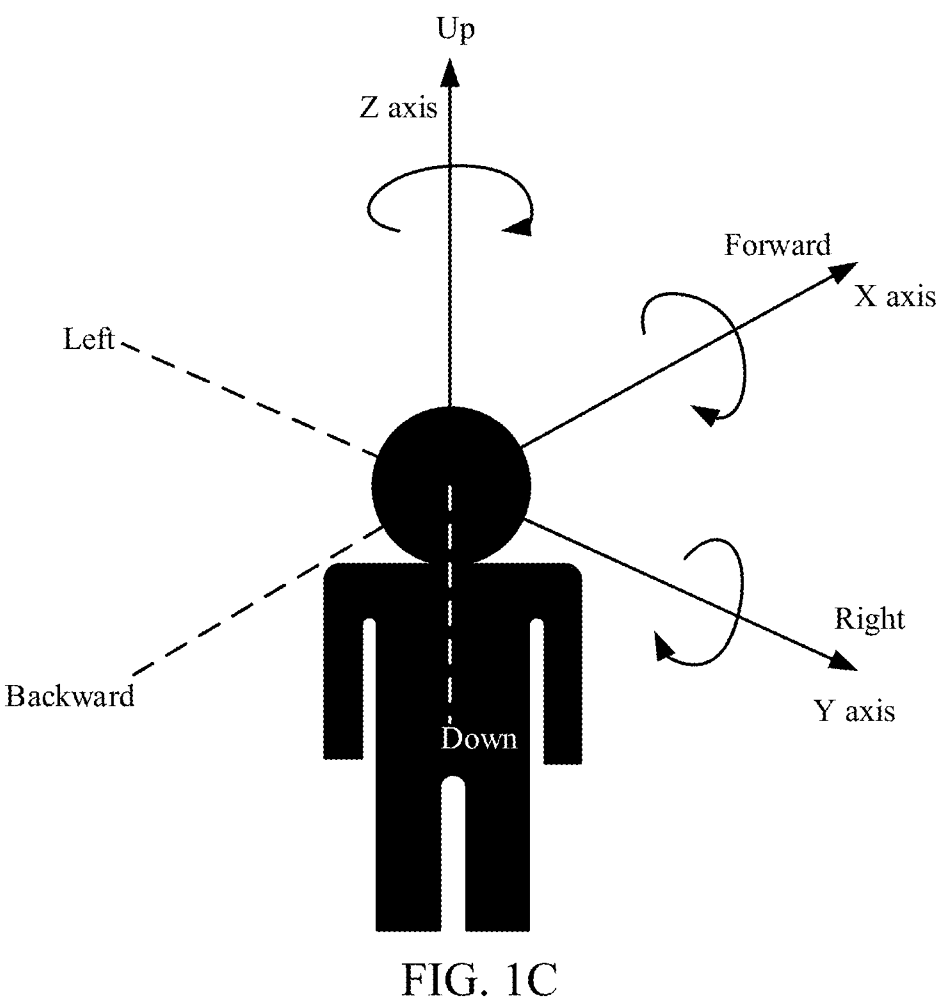
FIG. 1C is a schematic diagram of 6DoF according to an embodiment of this disclosure.
Figure 1D:
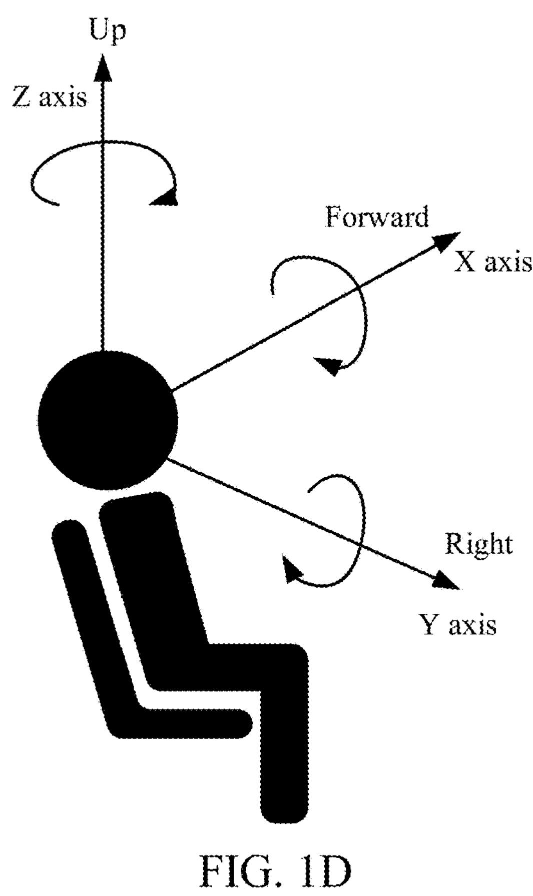
FIG. 1D is a schematic diagram of 3DoF according to an embodiment of this disclosure.
Figure 1E:
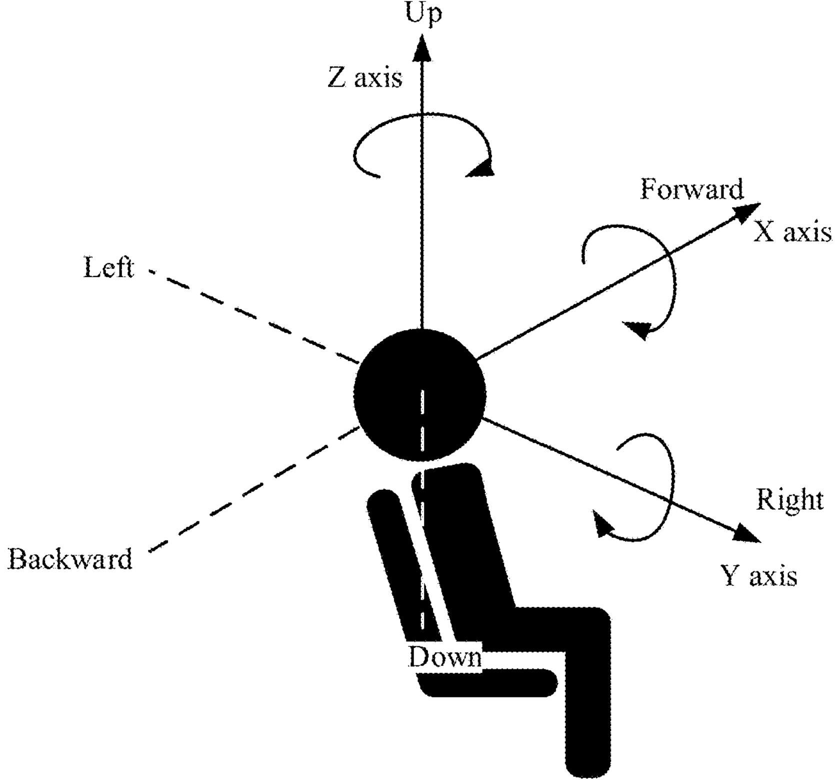
FIG. 1E is a schematic diagram of 3DoF+ according to an embodiment of this disclosure.

In some embodiments only a panoramic video can be captured if the capturing devices are adopted. After such a video is processed by the content production device and transmitted to the content playback device for corresponding data processing, a user on the side of the content playback device can only view 360-degree video information by performing some specific actions (e.g., rotating the head), and cannot obtain a corresponding video change by performing a non-specific action (e.g., moving the head), resulting in a poor VR experience. Therefore, depth information matching the panoramic video information needs to be additionally provided, to enable the user to obtain better immersion and a better VR experience, which involves a variety of production technologies. Common production technologies include a six degrees of freedom (6DoF) production technology. FIG. 1C is a schematic diagram of 6DoF according to an exemplary embodiment of this disclosure. 6DoF is divided into window 6DoF, omnidirectional 6DoF, and 6DoF. Window 6DoF means that rotational movements of a user around X and Y axes are constrained, and translational movements of the user along Z axis are constrained. For example, a user cannot see beyond a frame of a window, and the user cannot pass through the window. Omnidirectional 6DoF means that rotational movements of a user around X, Y, and Z axes are constrained. For example, the user cannot freely pass through 3D 360-degree VR content in a constrained movement region. 6DoF means that a user can freely translate along X, Y, and Z axes. For example, the user can freely walk in 3D 360-degree VR content. Similar to 6DoF, there are also 3DoF and 3DoF+ production technologies. FIG. 1D is a schematic diagram of 3DoF according to an exemplary embodiment of this disclosure. As shown in FIG. 1D, 3DoF means that a user is fixed at a center point of a 3D space, and the head of the user rotates around X, Y, and Z axes to view a screen provided by media content. FIG. 1E is a schematic diagram of 3DoF+ according to an exemplary embodiment of this disclosure. As shown in FIG. 1E, 3DoF+ means that when a virtual scene provided by immersive media has specific depth information, the head of a user can move within a limited space based on 3DoF to view a screen provided by media content.

(3) Encoding Procedure for Media Content of Immersive Media

Figure 1F:
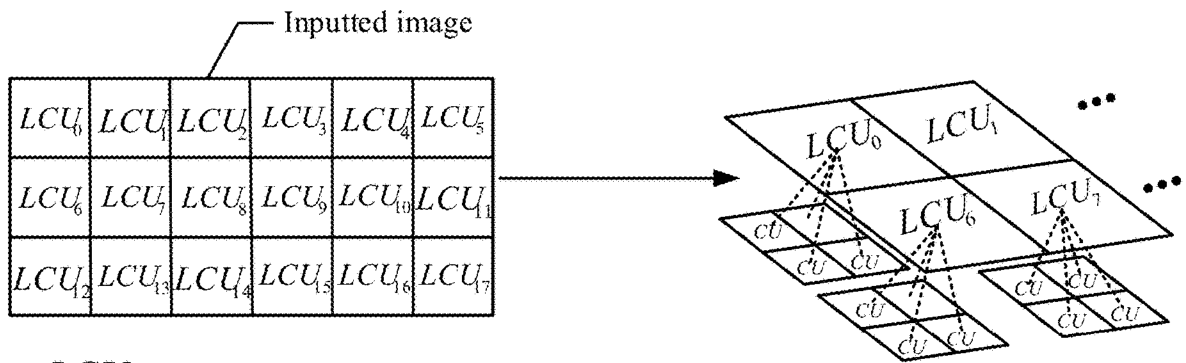
FIG. 1F is a schematic diagram of input image division according to an embodiment of this disclosure.

The projected image may be encoded directly, or the projected image may be encoded after being regionally encapsulated. In modern mainstream video coding technologies, using High Efficiency Video Coding (HEVC), Versatile Video Coding (VVC), and Audio Video Coding Standard (AVS) as an example, a hybrid encoding framework is used to perform a series of operations and processing on an inputted original video signal as follows:

1) Block partition structure: An inputted image can be partitioned into a plurality of non-overlapping processing units according to a size of the processing unit, and similar compression operations are performed on all the processing units. Such a processing unit can be referred to as a coding tree unit (CTU) or a largest coding unit (LCU). The CTU may be further partitioned more finely, to obtain one or more basic coding units, which are referred to as coding units (CUs). Each CU can be the most basic element in an encoding process. FIG. 1F is a schematic diagram of input image division according to an embodiment of this disclosure. Various possible encoding modes for each CU are described below.

2) Predictive coding: Predictive coding can include modes such as intra prediction and inter prediction. After an original video signal is predicted by using a selected reconstructed video signal, a residual video signal is obtained. The content production device needs to decide for a current CU to select the most suitable one in a plurality of possible predictive coding modes, and inform the content playback device.

a. Intra prediction: A predicted signal comes from a region in a same image that has been encoded and reconstructed.

b. Inter prediction: A predicted signal comes from another image (referred to as a reference image) that has been encoded and that is different from a current image.

3) Transform & Quantization: A transform operation, such as a Discrete Fourier Transform (DFT) or a Discrete Cosine Transform (DCT), can be performed on a residual video signal, to transform the signal into a transform domain, which is referred to as a transform coefficient. A lossy quantitative operation is performed on the signal in the transform domain, to lose some information, so that the quantized signal is beneficial to a compressed expression. In some video encoding standards, there may be more than one transform mode to select from. Therefore, the content production device also needs to select one of the more than one transform mode for a currently encoded CU, and inform the content playback device. The fineness of quantization usually depends on a quantization parameter (QP). A larger value of the QP represents that coefficients within a larger range will be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

4) Entropy coding or statistical coding: Statistical compression coding can be performed on quantized transform domain signals according to frequencies of occurrence of values, and finally, a binarized (0 or 1) compressed bitstream is outputted. In addition, entropy coding also can be performed on other information, such as a selected mode and a motion vector, generated through encoding, to reduce a bit rate. Statistical coding is a lossless coding mode that can effectively reduce a bit rate required for expressing a same signal. Common statistical coding modes include Variable Length Coding (VLC) or Content Adaptive Binary Arithmetic Coding (CABAC).

5) Loop filtering: Operations of inverse quantization, inverse transform, and prediction compensation (reverse operations of the foregoing operations 2 to 4) can be performed on an image that has been encoded, to obtain a reconstructed decoded image. Compared with an original image, a reconstructed image has some information different from that of the original image due to impact of quantization, resulting in a distortion. Performing a filtering operation, for example, deblocking, sample adaptive offset (SAO) filtering, or adaptive loop filter (ALF) filtering, on the reconstructed image can effectively reduce a degree of distortion produced by quantization. Because the filtered reconstructed image is used as a reference for subsequently encoding an image and is used for predicting a future signal, the foregoing filtering operation is also referred to as loop filtering, that is, a filtering operation in an encoding loop.

When a six degrees of freedom production technology is adopted (e.g., 6DoF when a user can move more freely in a simulated scene), in a video encoding procedure, a specific encoding mode (e.g., point cloud encoding) needs to be adopted for encoding.

(4) Encapsulation Procedure for Immersive Media

An audio bitstream and a video bitstream are encapsulated according to a file format of immersive media (e.g., International Organization for Standardization (ISO) base media file format (ISOBMFF)) into a file container to form a media file resource of the immersive media. The media file resource may be a media file or a media segment that forms a media file of the immersive media. In addition, metadata of the media file resource of the immersive media is recorded by using media presentation description (MPD) information according to requirements of the file format of the immersive media. The metadata herein is a general term for information related to presentation of the immersive media. The metadata may include description information for media content, description information for a viewport, signaling information related to presentation of the media content, and the like. As shown in FIG. 1A, the content production device will store the media presentation description information and media file resource formed after the data processing procedure.

II. Data Processing Procedure on the Side of the Content Playback Device Side:

(1) File Decapsulation and Decoding Procedures for Immersive Media

The content playback device can adaptively and/or dynamically obtain a media file resource of immersive media and corresponding media presentation description information from the content production device as recommended by the content production device or according to user requirements on the side of the content playback device. For example, the content playback device may determine an orientation and a position of a user according to tracking information of the head/eye/body of the user, and then dynamically request a corresponding media file resource from the content production device based on the determined orientation and position. The media file resource and media presentation description information are transmitted from the content production device to the content playback device using a transmission mechanism (e.g., DASH or SMT). The file decapsulation procedure on the side of the content playback device is reverse to the file encapsulation procedure on the side of the content production device. The content playback device decapsulates the media file resource according to requirements of the file format of the immersive media, to obtain an audio bitstream and a video bitstream. The decoding procedure on the side of the content playback device is reverse to the encoding procedure on the side of the content production device. The content playback device performs audio decoding on the audio bitstream to restore the audio content. In addition, the procedure of decoding the video bitstream by the content playback device includes the following: (1) Decode the video bitstream to obtain a 2D projected image, and (ii) reconstruction is performed on the projected image according to the media presentation description information, to convert the projected image into a 3D image. The reconstruction herein refers to processing of re-projecting the 2D projected image to a 3D space.

It can be understood according to the foregoing encoding procedure that on the side of the content playback device, for each CU, after obtaining a compressed bitstream, the content playback device first performs entropy decoding to obtain various mode information and quantized transform coefficients. Inverse quantization and inverse transform are performed on the coefficients, to obtain a residual signal. On the other hand, a predicted signal corresponding to the CU may be obtained according to the encoding mode information, and a reconstructed signal can be obtained by adding the residual signal and the predicted signal. Finally, a loop filtering operation needs to be performed on a reconstructed value of the decoded image before a final output signal is generated.

(2) Rendering Procedure for the Immersive Media

The content playback device renders audio content obtained by audio decoding and a 3D image obtained by video decoding according to metadata related to rendering and the viewport in the media presentation description information, and implements playback and output of the 3D image after completing the rendering. When the 3DoF and 3DoF+ production technologies are adopted, the content playback device mainly renders the 3D image based on a current viewpoint, parallax, depth information, and the like. When the 6DoF production technology is adopted, the content playback device mainly renders the 3D image in the viewport based on the current viewpoint. The viewpoint refers to a viewing position point of the user. The parallax refers to a line-of-sight difference caused by the two eyes of the user or a line-of-sight difference generated due to a movement. The viewport refers to a viewed region.

The immersive media system supports the data box. The data box can refer to a data block or object including metadata. That is, the data box includes metadata of corresponding media content. Immersive media may include a plurality of data boxes, for example, including a rotation data box, a coverage information data box, a media file format data box, and the like. In a scenario of the immersive media system, to improve a user's viewing experience, a content producer usually adds more diverse presentation forms for the media content of immersive media, and zooming is one of the important presentation forms. The zoom policy can be configured in the media format data box of the immersive media, for example, be configured in an ISOBMFF data box. Description information corresponding to the zoom policy may be configured in a zoom description signaling file, for example, be configured in a sphere region zooming descriptor or a 2D region zooming descriptor. According to related encoding standards (e.g., AVS) for immersive media, for the syntax of the media file format data box of the immersive media, reference may be made to Table 1 below:

TABLE 1

```
aligned(8) class RegionWiseZoomingStruct( ) {
  unsigned int(8) num_regions;
  for (i = 0; i < num_regions; i++) {
    unsigned int(32) zoom_reg_width[i];
    unsigned int(32) zoom_reg_height[i];
    unsigned int(32) zoom_reg_top[i];
    unsigned int(32) zoom_reg_left[i];
    unsigned int(8) zoom_ratio;
    unsigned int(8) zoom_algorithm_type;
    unsigned int(8) zoom_symbolization_type;
    unsigned int(8) zoom_area_type;
    string zoom_description;
  }
}
```

Figure 2:
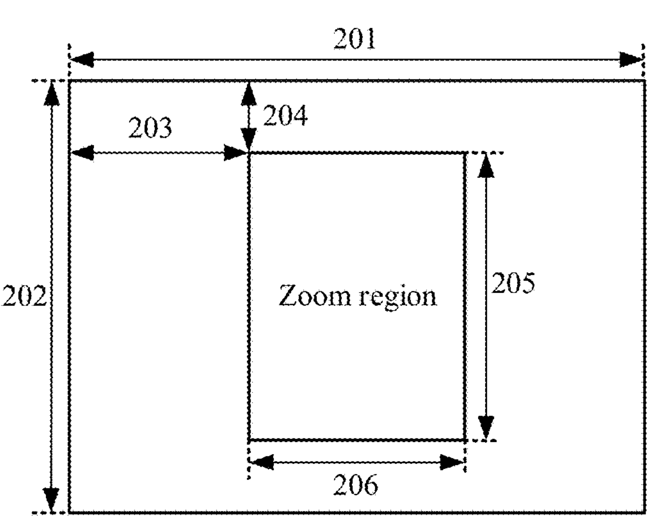
FIG. 2 is a schematic diagram of the $i^{th}$ zoom region according to an embodiment of this disclosure.

The semantic meanings of the syntax shown in Table 1 above are as follows: num_regions indicates a quantity of sphere regions corresponding to a same omnidirectional video or a quantity of zoom regions in 2D regions on a projected image. zoom_reg_width[i] indicates a width of the $i^{th}$ zoom region. zoom_reg_height[i] indicates a height of the $i^{th}$ zoom region. zoom_reg_top[i] indicates a vertical offset of the $i^{th}$ zoom region. zoom_reg_left[i] indicates a horizontal offset of the $i^{th}$ zoom region. FIG. 2 is a schematic diagram of the $i^{th}$ zoom region according to an exemplary embodiment of this disclosure. As shown in FIG. 2, 201 represents a width of a projected image to which the $i^{th}$ zoom region belongs, 202 represents a height of the projected image to which the $i^{th}$ zoom region belongs, 203 represents the horizontal offset zoom_reg_left[i] of the $i^{th}$ zoom region, 204 represents the vertical offset zoom_reg_top[i] of the $i^{th}$ zoom region, 205 represents the height zoom_reg_height[i] of the $i^{th}$ zoom region, and 206 represents the width zoom_reg_width[i] of the $i^{th}$ zoom region. zoom_ratio indicates a zoom ratio of the $i^{th}$ zoom region and is in unit of 2 to 3, i being a positive integer. When a value of zoom_ratio is set to 0, it indicates that a size of the $i^{th}$ zoom region after zoom processing is performed thereon is the same as a size thereof on which no zoom processing is performed. When the value of zoom_ratio is set to non-0, the value of zoom_ratio indicates an actual ratio or an approximate ratio between the size of the $i^{th}$ zoom region after zoom processing is performed thereon and the size (original size) thereof on which no zoom processing is performed. zoom_algorithm_type indicates a zoom algorithm type used when the $i^{th}$ zoom region is rendered. A mapping relationship between a value of zoom_algorithm_type and the zoom algorithm type is shown in Table 2:

TABLE 2

| Value | Description |
|---|---|
| 0 | Raised zoom |
| 1 | Spherical zoom (ensuring a minimal center distortion) |
| 2 | Disc-shaped uniform zoom |
| 3 . . . 255 | Undefined |

zoom_symbolization_type indicates a boundary symbol type of the $i^{th}$ zoom region. zoom_area_type indicates a type of the $i^{th}$ zoom region, and a mapping relationship between a value of zoom_algorithm_type and the type of the zoom region is shown in Table 3:

TABLE 3

| Value | Description |
|---|---|
| 0 | Zoom region for director editing, that is, zooming a video according to a creative intention of a content provider |
| 1 | Zoom region selected according to measurement results of viewing statistics |
| 2 . . . 239 | Reserved |
| 240 . . . 255 | Undefined |

zoom_description carries text description of the $i^{th}$ zoom region.

Description information corresponding to a zoom policy of a media file format data box of immersive media is stored in a zoom description signaling file of the immersive media. The zoom description signaling file may include at least one of a sphere region zooming (SphereRegionZooming, SRWZ) descriptor or a two-dimensional (2D) region zooming (2DRegionZooming, 2DWZ) descriptor.

The sphere region zooming (SphereRegionZooming, SRWZ) descriptor is a supplemental property (SupplementalProperty) element of which a scheme identifier (@schemeIdUri) is equal to "urn:ays:ims:2018:srwz". The SRWZ descriptor indicates a sphere region of an omnidirectional video in an omnidirectional video track carried by a representation hierarchy corresponding thereto and one or more zoom regions of the sphere region on a projected image of the omnidirectional video.

When there is an SRWZ descriptor applicable to the representation hierarchy, and a sphere region zooming data box (SphereRegionZoomingBox) also exists in a track corresponding to the representation hierarchy, the SRWZ descriptor carries information equivalent to SphereRegionZoomingBox. The content playback device can request, according to the SRWZ descriptor, to obtain a video file corresponding to a sphere region zooming operation on the omnidirectional video. The SRWZ descriptor includes elements and properties defined in Table 4 below.

TABLE 4

| Element and property | Use | Data type | Description |
|---|---|---|---|
| sphRegionZoom | 1 | omaf:sphRegionZoomType | Container element, of which a property and an element indicate a sphere region and a zoom region corresponding thereto. |
| sphRegionZoom@ shape_type | Optional | xs:unsignedByte | Indicate a shape type of a sphere region. If a value is set to 0, a sphere region is indicated by four large circles, and if a value is set to 1, a sphere region is indicated by two azimuths and two elevation angle circles. |

TABLE 4-continued

| Element and property | Use | Data type | Description |
| --- | --- | --- | --- |
| sphRegionZoom@ remaining_area_flag | Optional | xs:boolean | A value of 0 represents that all sphere regions are defined by the SphRegionZoom.sphRegionInfo element, a value of 1 represents that all sphere regions except the last sphere region are defined by the SphRegionZoom.sphRegionInfo element, and the last remaining sphere region is a sphere region not covered by a sphere region set defined by the SphRegionZoom.sphRegionInfo element in a content coverage range. |
| sphRegionZoom@ view_idc_presence_flag | Optional | xs:boolean | A value of 0 represents that the SphRegionZoom.sphRegionInfo@ view_idc property does not exist. A value of 1 represents that the SphRegionZoom.sphRegionInfo@ view_idc property exists, indicating a relationship between a sphere region and a specific view (a left view, a right view, or both) or a monocular image. |
| sphRegionZoom@ default_view_idc | Condition required | omaf:ViewType | A value of 0 represents that a sphere region is a monocular image, a value of 1 represents that a sphere region is a left view of a stereo image, a value of 2 represents that a sphere region is a right view of a stereo image, and a value of 3 represents that a sphere region includes a left view and a right view of a stereo image. |
| sphRegionZoom.sphRegionInfo | 1 . . . 255 | omaf:zoomInfoType | Element, of which a property describes sphere region information in the sphRegionZoom element. There is at least one specified sphere region. |
| sphRegionZoom.sphRegionInfo@ view_idc | Condition required | omaf:ViewType | A value of 0 represents that a sphere region is a monocular image, a value of 1 represents that a sphere region is a left view of a stereo image, a value of 2 represents that a sphere region is a right view of a stereo image, and a value of 3 represents that a sphere region includes a left view and a right view of a stereo image. |
| sphRegionZoom.sphRegionInfo@ centre_azimuth | Condition required | omaf:Range1 | Indicate an azimuth of a center point of a sphere region in unit of 2-16 degrees. |
| sphRegionZoom.sphRegionInfo@ centre_elevation | Condition required | omaf:Range2 | Indicate an elevation angle of a center point of a sphere region in unit of 2-16 degrees. |
| sphRegionZoom.sphRegionInfo@ centre_tilt | Condition required | omaf:Range1 | Indicate a tilt angle of a center point of a sphere region in unit of 2-16 degrees. |
| sphRegionZoom.sphRegionInfo@ azimuth_range | Condition required | omaf:HRange | Define an azimuth range of a sphere region in unit of 2-16 degrees using a center point thereof. |
| sphRegionZoom.sphRegionInfo@ elevation_range | Condition required | omaf:HRange | Define an elevation angle range of a sphere region in unit of 2-16 degrees using a center point thereof. |
| sphRegionZoom.zoomInfo | 1 . . . 255 | omaf:sphRegionInfoType | Element, of which a property describes zoom region information corresponding to a sphere region defined by the sphRegionZoom.sphRegionInfo element. There is at least one specified zoom region. |
| sphRegionZoom.zoomInfo@ zoom_region_left | Condition required | xs:unsignedShort | Specify a horizontal coordinate of the upper left corner of a zoom region in a projected image in unit of a brightness sample. |
| sphRegionZoom.zoomInfo@ zoom_region_right | Condition required | xs:unsignedShort | Specify a vertical coordinate of the upper left corner of a zoom region in a projected image in unit of a brightness sample. |
| sphRegionZoom.zoomInfo@ zoom_region_width | Condition required | xs:unsignedShort | Specify a width of a zoom region in a projected image in unit of a brightness sample. |
| sphRegionZoom.zoomInfo@ zoom_region_height | Condition required | xs:unsignedShort | Specify a height of a zoom region in a projected image in unit of a brightness sample. |
| SphRegionZoom.zoomInfo@ zoom_ratio | Condition required | xs:unsignedByte | Indicate a zoom ratio of a zoom region in a projected image. |

TABLE 4-continued

| Element and property | Use | Data type | Description |
|---|---|---|---|
| SphRegionZoom.zoomInfo@ zoom_algorithm_type | Optional | omaf:listofUnsignedByte | Indicate a zoom algorithm of a zoom region in a projected image. |
| SphRegionZoom.zoomInfo@ zoom_symbolization_type | Optional | omaf:listofUnsignedByte | Indicate a symbolized type of a zoom boundary of a zoom region in a projected image. |
| SphRegionZoom.zoomInfo@ zoom_description | Optional | xs:string | Indicate description information of a zoom region in a projected image. |

The 2D region zooming (2DRegionZooming, 2DWZ) descriptor corresponding to a media file format data box of immersive media is a supplemental property (SupplementalProperty) element of which a scheme identifier (@schemeIdUri) is equal to "urn:mpeg:mpegtomaf:2018: 2dwz". The 2DWZ descriptor indicates a 2D region on a projected image of an omnidirectional video in an omnidirectional video track carried by a representation hierarchy corresponding thereto and one or more zoom regions of the 2D region on the projected image of the omnidirectional video.

When there is a 2DWZ descriptor applicable to the representation hierarchy, and a 2D region zooming data box (2DRegionZoomingBox) also exists in a track corresponding to the representation hierarchy, the 2DWZ descriptor carries information equivalent to 2DRegionZoomingBox. The content playback device can request, according to the 2DWZ descriptor, to obtain a video file corresponding to a 2D region zooming operation on the projected image of the omnidirectional video. The 2DWZ descriptor includes elements and properties defined in Table 5 below.

TABLE 5

| Element and property | Use | Data type | Description |
|---|---|---|---|
| twoDRegionZoom | 1 | omaf:twoDRegionZoomType | Container element, of which a property and an element indicate a 2D region and a zoom region corresponding thereto. |
| twoDRegionZoom@ remaining_area_flag | Optional | xs:boolean | A value of 0 represents that all 2D regions are defined by the twoDRegionZoom.twoDRegionInfo element, a value of 1 represents that all 2D regions except the last 2D region are defined by the twoDRegionZoom.twoDRegionInfo element, and the last remaining 2D region is a 2D region not covered by a 2D region set defined by the twoDRegionZoom.twoDRegionInfo element in a content coverage range. |
| twoDRegionZoom@ view_idc_presence_flag | Optional | xs:boolean | A value of 0 represents that the twoDRegionZoom.twoDRegionInfo@ view_idc property does not exist. A value of 1 represents that the twoDRegionZoom.twoDRegionInfo@ view_idc property exists, indicating a relationship between a 2D region and a specific view (a left view, a right view, or both) or a monocular image. |
| twoDRegionZoom@ default_view_idc | Condition required | omaf:ViewType | A value of 0 represents that a 2D region is a monocular image, a value of 1 represents that a 2D region is a left view of a stereo image, a value of 2 represents that a 2D region is a right view of a stereo image, and a value of 3 represents that a 2D region includes a left view and a right view of a stereo image. |
| twoDRegionZoom.twoDRegionInfo | 1 . . . 255 | omaf:twoDRegionInfoType | Element, of which a property describes 2D region information in the twoDRegionZoom element. There is at least one specified 2D region. |
| twoDRegionZoom.twoDRegionInfo@ view_idc | Condition required | omaf:ViewType | A value of 0 represents that a 2D region is a monocular image, a value of 1 represents that a 2D region is a left view of a stereo image, a value of 2 represents that a 2D region is a right view of a stereo image, and a value of 3 represents that a 2D region includes a left view and a right view of a stereo image. |

TABLE 5-continued

| Element and property | Use | Data type | Description |
| --- | --- | --- | --- |
| twoDRegionZoom.twoDRegionInfo@ left_offset | Condition required | xs:unsignedShort | Specify a horizontal coordinate of the upper left corner of a 2D region in a projected image in unit of a brightness sample. |
| twoDRegionZoom.twoDRegionInfo@ top_offset | Condition required | xs:unsignedShort | Specify a vertical coordinate of the upper left corner of a 2D region in a projected image in unit of a brightness sample. |
| twoDRegionZoom.twoDRegionInfo@ region_width | Condition required | xs:unsignedShort | Specify a width of a 2D region in a projected image in unit of a brightness sample. |
| twoDRegionZoom.twoDRegionInfo@ region_height | Condition required | xs:unsignedShort | Specify a height of a 2D region in a projected image in unit of a brightness sample. |
| twoDRegionZoom.zoomInfo | 1 . . . 255 | omaf:zoomInfoType | Element, of which a property describes zoom region information corresponding to a 2D region defined by the twoDRegionZoom.twoDRegionInfo element. There is at least one specified zoom region. |
| twoDRegionZoom.zoomInfo@ zoom_region_left | Condition required | xs:unsignedShort | Specify a horizontal coordinate of the upper left corner of a zoom region in a projected image in unit of a brightness sample. |
| twoDRegionZoom.zoomInfo@ zoom_region_right | Condition required | xs:unsignedShort | Specify a vertical coordinate of the upper left corner of a zoom region in a projected image in unit of a brightness sample. |
| twoDRegionZoom.zoomInfo@ zoom_region_width | Condition required | xs:unsignedShort | Specify a width of a zoom region in a projected image in unit of a brightness sample. |
| twoDRegionZoom.zoomInfo@ zoom_region_height | Condition required | xs:unsignedShort | Specify a height of a zoom region in a projected image in unit of a brightness sample. |
| twoDRegionZoom.zoomInfo@ zoom_ratio | Condition required | xs:unsignedByte | Indicate a zoom ratio of a zoom region in a projected image. |
| twoDRegionZoom.zoomInfo@ zoom_algorithm_type | Optional | omaf:listofUnsignedByte | Indicate a zoom algorithm of a zoom region in a projected image. |
| twoDRegionZoom.zoomInfo@ zoom_symbolization_type | Optional | omaf:listofUnsignedByte | Indicate a symbolized type of a zoom boundary of a zoom region in a projected image. |
| twoDRegionZoom.zoomInfo@ zoom_description | Optional | xs:string | Indicate description information of a zoom region in a projected image. |

According to the media file format data box shown in Table 1, with reference to the description information in the sphere region zooming descriptor shown in Table 4 and the 2D region zooming descriptor shown in Table 5, only an autonomous zoom operation of a user on the side of the content playback device on immersive media can be supported. As can be learned from the above, an autonomous zoom behavior of a user may cause bandwidth waste, and a better viewing experience cannot be obtained. To save bandwidth while improving the user viewing experience, in the embodiments of this disclosure, the media file format data box and media presentation description file of the related immersive media are extended. For example, the semantic meanings of the syntax of the extended media file format data box, reference may be made to Table 6 below:

TABLE 6

```
aligned(8) class RegionWiseZoomingStruct( ) {
  unsigned int(8) num_regions;
  for (i = 0; i < num_regions; i++) {
    unsigned int(32) zoom_reg_width[i];
    unsigned int(32) zoom_reg_height[i];
    unsigned int(32) zoom_reg_top[i];
    unsigned int(32) zoom_reg_left[i];
    unsigned int(8) zoom_ratio;
    unsigned int(8) zoom_algorithm_type;
```

TABLE 6-continued

```
    unsigned int(8) zoom_symbolization_type;
    unsigned int(8) zoom_area_type;
    string zoom_description;
  }
  unsigned bit(1) auto_zoom_flag;
  bit(7) reserved;
  if(auto_zoom_flag == 1){
    unsigned int(8) zoom_steps;
    for(i = 0; i < zoom_steps; i++){
      unsigned int(8) zoom_ratio;
      unsigned int(8) zoom_duration;
      unsigned int(8) zoom_duration_unit;
    }
  }
}
```

Semantic meanings of the extended syntax newly added to Table 6 above relative to Table 1 are the following (1) to (iv):

(1) The zoom flag field auto_zoom_flag indicates whether to enable a target zoom mode (e.g., a director zoom mode). When a value of auto_zoom_flag is set to an effective value, it indicates that the target zoom mode is enabled, that is, zoom processing needs to be performed on the $i^{th}$ zoom region in the target zoom mode. When a value of auto_zoom_flag is set to an ineffective value, it indicates that the target zoom mode is disabled, that is, zoom processing does not need to be performed on the $i^{th}$ zoom region in the target zoom mode, i being a positive integer. The effective value and ineffective value are set according to the requirements of the encoding standard. Using the AVS standard as an example, the effective value is 1, and the ineffective value is 0.

(ii) The zoom step field zoom_steps indicates that a quantity of zoom steps included when the zoom processing is performed on the $i^{th}$ zoom region of the immersive media in the target zoom mode is m, m being a positive integer, and is used for indicating that zoom processing needs to be performed on the $i^{th}$ zoom region in target zoom mode m times.

(iii) When one zoom step corresponds to one zoom ratio field zoom_ratio, m zoom steps correspond to m zoom_ratio fields. The $j^{th}$ zoom_ratio field indicates a zoom ratio adopted when the $j^{th}$ zoom step in the zoom processing is performed on the $i^{th}$ zoom region of the immersive media. The zoom_ratio field is in unit of 2 to 3, j being a positive integer and j≤m. When a value of the $j^{th}$ zoom_ratio field is 0, the $j^{th}$ zoom_ratio field indicates that a size of the $i^{th}$ zoom region of the immersive media after the $j^{th}$ zoom step of the zoom processing is performed in the target zoom mode thereon is the same as a size thereof before the zoom processing is performed thereon. When the value of the $j^{th}$ zoom_ratio field is non-0, the $j^{th}$ zoom_ratio field indicates that a ratio between the size of the $i^{th}$ zoom region of the immersive media after the $j^{th}$ zoom step of the zoom processing is performed in the target zoom mode thereon and the size thereof before the zoom processing is performed thereon is the value of the $j^{th}$ zoom_ratio field.

(iv) When one zoom step corresponds to one zoom duration zoom_duration and one unit of measure of the duration zoom_duration_unit, m zoom steps correspond to m zoom_duration fields and m zoom_duration unit fields. The $j^{th}$ zoom_duration field indicates a value of a duration when the $j^{th}$ zoom step of the zoom processing is performed on the $i^{th}$ zoom region of the immersive media. A value of the zoom_duration field is non-zero value. The $i^{th}$ zoom_duration unit field is used for indicating a unit of measure of the duration when the $j^{th}$ zoom step of the zoom processing is performed on the $i^{th}$ zoom region of the immersive media, the zoom_duration unit field being in unit of second, and the zoom_duration unit field being a non-zero value.

The zoom description signaling file includes at least one of the following: a sphere region zooming descriptor or a 2D region zooming descriptor. For semantic meanings of the extended syntax of the sphere region zooming descriptor, reference may be made to Table 7 below:

TABLE 7

| Element and property | Use | Data type | Description |
|---|---|---|---|
| sphRegionZoom | 1 | omaf:sphRegionZoomType | Container element, of which a property and an element indicate a sphere region and a zoom region corresponding thereto. |
| sphRegionZoom@ shape_type | Optional | xs:unsignedByte | Indicate a shape type of a sphere region. If a value is set to 0, a sphere region is indicated by four large circles, and if a value is set to 1, a sphere region is indicated by two azimuths and two elevation angle circles. |
| sphRegionZoom@ remaining_area_flag | Optional | xs:boolean | A value of 0 represents that all sphere regions are defined by the SphRegionZoom.sphRegionInfo element, a value of 1 represents that all sphere regions except the last sphere region are defined by the SphRegionZoom.sphRegionInfo element, and the last remaining sphere region is a sphere region not covered by a sphere region set defined by the SphRegionZoom.sphRegionInfo element in a content coverage range. |
| sphRegionZoom@ view_idc_presence_flag | Optional | xs:boolean | A value of 0 represents that the SphRegionZoom.sphRegionInfo@ view_idc property does not exist. A value of 1 represents that the SphRegionZoom.sphRegionInfo@ view_idc property exists, indicating a relationship between a sphere region and a specific view (a left view, a right view, or both) or a monocular image. |

TABLE 7-continued

| Element and property | Use | Data type | Description |
|---|---|---|---|
| sphRegionZoom@ default_view_idc | Condition required | omaf:ViewType | A value of 0 represents that a sphere region is a monocular image, a value of 1 represents that a sphere region is a left view of a stereo image, a value of 2 represents that a sphere region is a right view of a stereo image, and a value of 3 represents that a sphere region includes a left view and a right view of a stereo image. |
| sphRegionZoom.sphRegionInfo | 1 . . . 255 | omaf:zoomInfoType | Element, of which a property describes sphere region information in the sphRegionZoom element. There is at least one specified sphere region. |
| sphRegionZoom.sphRegionInfo@ view_idc | Condition required | omaf:ViewType | A value of 0 represents that a sphere region is a monocular image, a value of 1 represents that a sphere region is a left view of a stereo image, a value of 2 represents that a sphere region is a right view of a stereo image, and a value of 3 represents that a sphere region includes a left view and a right view of a stereo image. |
| sphRegionZoom.sphRegionInfo@ centre_azimuth | Condition required | omaf:Range1 | Indicate an azimuth of a center point of a sphere region in unit of 2-16 degrees. |
| sphRegionZoom.sphRegionInfo@ centre_elevation | Condition required | omaf:Range2 | Indicate an elevation angle of a center point of a sphere region in unit of 2-16 degrees. |
| sphRegionZoom.sphRegionInfo@ centre_tilt | Condition required | omaf:Range1 | Indicate a tilt angle of a center point of a sphere region in unit of 2-16 degrees. |
| sphRegionZoom.sphRegionInfo@ azimuth_range | Condition required | omaf:HRange | Define an azimuth range of a sphere region in unit of 2-16 degrees using a center point thereof. |
| sphRegionZoom.sphRegionInfo@ elevation_range | Condition required | omaf:HRange | Define an elevation angle range of a sphere region in unit of 2-16 degrees using a center point thereof. |
| sphRegionZoom.zoomInfo | 1 . . . 255 | omaf:sphRegionInfoType | Element, of which a property describes zoom region information corresponding to a sphere region defined by the sphRegionZoom.sphRegionInfo element. There is at least one specified zoom region. |
| sphRegionZoom.zoomInfo@ zoom_region_left | Condition required | xs:unsgnedShort | Specify a horizontal coordinate of the upper left corner of a zoom region in a projected image in unit of a brightness sample. |
| sphRegionZoom.zoomInfo@ zoom_region_right | Condition required | xs:unsgnedShort | Specify a vertical coordinate of the upper left corner of a zoom region in a projected image in unit of a brightness sample. |
| sphRegionZoom.zoomInfo@ zoom_region_width | Condition required | xs:unsgnedShort | Specify a width of a zoom region in a projected image in unit of a brightness sample. |
| sphRegionZoom.zoomInfo@ zoom_region_height | Condition required | xs:unsignedShort | Specify a height of a zoom region in a projected image in unit of a brightness sample. |
| SphRegionZoom.zoomInfo@ zoom_ratio | Condition required | xs:unsignedByte | Indicate a zoom ratio of a zoom region in a projected image. |
| SphRegionZoom.zoomInfo@ zoom_algorithm_type | Optional | omaf:listofUnsignedByte | Indicate a zoom algorithm of a zoom region in a projected image. |
| SphRegionZoom.zoomInfo@ zoom_symbolization_type | Optional | omaf:listofUnsignedByte | Indicate a symbolized type of a zoom boundary of a zoom region in a projected image. |
| SphRegionZoom.zoomInfo@ zoom_description | Optional | xs:string | Indicate description information of a zoom region in a projected image. |

TABLE 7-continued

| Element and property | Use | Data type | Description |
|---|---|---|---|
| SphRegionZoom.zoomInfo@ auto_zoom_flag | Condition required | xs:boolean | Indicate whether to enable a director zoom mode. |
| SphRegionZoom.zoomInfo@ zoom_ratio | Condition required | xs:unsignedByte | Indicate a zoom ratio at which a zoom step is actually performed, which is in unit of $2^{-3}$. When being 0, a value of the field indicates that the region has not been zoomed. When being non-0, the value of the field indicates an actual ratio or an approximate ratio between the size of the region after zooming and an original size thereof. |
| SphRegionZoom.zoomInfo@ zoom_duration | Condition required | xs:unsignedByte | Indicate a duration of each zoom step, which is in unit of the zoom_duration_unit field, where a value of the field cannot be 0. |
| SphRegionZoom.zoomInfo@ zoom_duration_unit | Condition required | xs:unsignedByte | zoom_duration_unit indicates a unit of measure of a zoom step duration, which is in unit of second, where a value of the field cannot be 0. |

Comparing Table 7 with Table 4, description information of a zoom policy in the target zoom mode (e.g., the director zoom mode) is added to the extended sphere region zooming descriptor in this embodiment of this disclosure relative to the sphere region zooming descriptor in the related standard, and includes the elements and properties in Table 7 above, SphRegionZoom.zoomInfo@auto_zoom_flag, SphRegionZoom.zoomInfo@zoom_ratio, SphRegionZoom.zoomInfo@zoom duration, and SphRegionZoom.zoomInfo@zoom duration unit, as well as related descriptions of the elements and properties.

For semantic meanings of the extended syntax of the 2D region zooming descriptor, reference may be made to Table 8 below:

TABLE 8

| Element and property | Use | Data type | Description |
|---|---|---|---|
| twoDRegionZoom | 1 | omaf:twoDRegionZoomType | Container element, of which a property and an element indicate a 2D region and a zoom region corresponding thereto. |
| twoDRegionZoom@ remaining_area_flag | Optional | xs:boolean | A value of 0 represents that all 2D regions are defined by the twoDRegionZoom.twoDRegionInfo element, a value of 1 represents that all 2D regions except the last 2D region are defined by the twoDRegionZoom.twoDRegionInfo element, and the last remaining 2D region is a 2D region not covered by a 2D region set defined by the twoDRegionZoom.twoDRegionInfo element in a content coverage range. |
| twoDRegionZoom@ view_idc_presence_flag | Optional | xs:boolean | A value of 0 represents that the twoDRegionZoom.twoDRegionInfo@ view_idc property does not exist. A value of 1 represents that the twoDRegionZoom.twoDRegionInfo@ view_idc property exists, indicating a relationship between a 2D region and a specific view (a left view, a right view, or both) or a monocular image. |
| twoDRegionZoom@ default_view_idc | Condition required | omaf:ViewType | A value of 0 represents that a 2D region is a monocular image, a value of 1 represents that a 2D region is a left view of a stereo image, a value of 2 represents that a 2D region is a right view of a stereo image, and a value of 3 represents that a 2D region includes a left view and a right view of a stereo image. |

TABLE 8-continued

| Element and property | Use | Data type | Description |
|---|---|---|---|
| twoDRegionZoom.twoDRegionInfo | 1 . . . 255 | omaf:twoDRegionInfoType | Element, of which a property describes 2D region information in the twoDRegionZoom element. There is at least one specified 2D region. |
| twoDRegionZoom.twoDRegionInfo@ view_idc | Condition required | omaf:ViewType | A value of 0 represents that a 2D region is a monocular image, a value of 1 represents that a 2D region is a left view of a stereo image, a value of 2 represents that a 2D region is a right view of a stereo image, and a value of 3 represents that a 2D region includes a left view and a right view of a stereo image. |
| twoDRegionZoom.twoDRegionInfo@ left_offset | Condition required | xs:unsignedShort | Specify a horizontal coordinate of the upper left corner of a 2D region in a projected image in unit of a brightness sample. |
| twoDRegionZoom.twoDRegionInfo@ top_offset | Condition required | xs:unsignedShort | Specify a vertical coordinate of the upper left corner of a 2D region in a projected image in unit of a brightness sample. |
| twoDRegionZoom.twoDRegionInfo@ region_width | Condition required | xs:unsignedShort | Specify a width of a 2D region in a projected image in unit of a brightness sample. |
| twoDRegionZoom.twoDRegionInfo@ region_height | Condition required | xs:unsignedShort | Specify a height of a 2D region in a projected image in unit of a brightness sample. |
| twoDRegionZoom.zoomInfo | 1 . . . 255 | omaf:zoomInfoType | Element, of which a property describes zoom region information corresponding to a 2D region defined by the twoDRegionZoom.twoDRegionInfo element. There is at least one specified zoom region. |
| twoDRegionZoom.zoomInfo@ zoom_region_left | Condition required | xs:unsignedShort | Specify a horizontal coordinate of the upper left corner of a zoom region in a projected image in unit of a brightness sample. |
| twoDRegionZoom.zoomInfo@ zoom_region_right | Condition required | xs:unsignedShort | Specify a vertical coordinate of the upper left corner of a zoom region in a projected image in unit of a brightness sample. |
| twoDRegionZoom.zoomInfo@ zoom_region_width | Condition required | xs:unsignedShort | Specify a width of a zoom region in a projected image in unit of a brightness sample. |
| twoDRegionZoom.zoomInfo@ zoom_region_height | Condition required | xs:unsignedShort | Specify a height of a zoom region in a projected image in unit of a brightness sample. |
| twoDRegionZoom.zoomInfo@ zoom_ratio | Condition required | xs:unsignedByte | Indicate a zoom ratio of a zoom region in a projected image. |
| twoDRegionZoom.zoomInfo@ zoom_algorithm_type | Optional | omaf:listofUnsignedByte | Indicate a zoom algorithm of a zoom region in a projected image. |
| twoDRegionZoom.zoomInfo@ zoom_symbolization_type | Optional | omaf:listofUnsignedByte | Indicate a symbolized type of a zoom boundary of a zoom region in a projected image. |
| twoDRegionZoom.zoomInfo@ zoom_description | Optional | xs:string | Indicate description information of a zoom region in a projected image. |
| twoDRegionZoom.zoomInfo@ auto_zoom_flag | Condition required | xs:boolean | Indicate whether to enable a director zoom mode. |
| twoDRegionZoom.zoomInfo@ zoom_ratio | Condition required | xs:unsignedByte | Indicate a zoom ratio at which a zoom step is actually performed, which is in unit of $2^{-3}$. When being 0, a value of the field indicates that the region has not been zoomed. When being non-0, the value of the field indicates an actual ratio or an approximate ratio between the size of the region after zooming and an original size thereof. |
| twoDRegionZoom.zoomInfo@ zoom_duration | Condition required | xs:unsignedByte | Indicate a duration of each zoom step, which is in unit of the zoom_duration_unit field, where a value of the field cannot be 0. |

TABLE 8-continued

| Element and property | Use | Data type | Description |
|---|---|---|---|
| twoDRegionZoom.zoomInfo@ zoom_duration_unit | Condition required | xs:unsignedByte | zoom_duration_unit indicates a unit of measure of a zoom step duration, which is in unit of second, where a value of the field cannot be 0. |

Comparing Table 8 with Table 5, description information of a zoom policy in the target zoom mode (e.g., the director zoom mode) is added to the extended 2D region zooming descriptor in this embodiment of this disclosure relative to the 2D region zooming descriptor in the related standard, and includes the elements and properties in Table 8 above, twoDRegionZoom.zoomInfo@ auto_zoom_flag, twoDRegionZoom.zoomInfo@ zoom_ratio, twoDRegionZoom.zoomInfo@ zoom_duration, and twoDRegionZoom.zoomInfo@ zoom_duration_unit, as well as related descriptions of the elements and properties.

According to the media file format data box shown in Table 6 above in the embodiments of this disclosure, with reference to the descriptions on the zoom policy in the sphere region zooming descriptor shown in Table 7 and the 2D region zooming descriptor shown in Table 8, in the target zoom mode (e.g., the director zoom mode), the user on the side of the content playback device can obtain a video file corresponding to a current resolution on a side of the content playback device based on an MPD file and consumes it without requesting videos of all zoom resolution versions, thereby saving the transmission bandwidth. In addition, when the content playback device consumes a video file corresponding to a target zoom mode at a current resolution, the content playback device automatically presents, according to the target zoom mode, a zoom effect specified by an immersive media content producer, so that a user can obtain a best viewing experience.

FIG. 3 is a flowchart of a data processing method for immersive media according to an exemplary embodiment of this disclosure. The method may be performed by the content production device or the content playback device in the immersive media system. The method includes the following steps S301 and S302:

In step S301, obtain a media file format data box of immersive media, the media file format data box including a zoom policy of the $i^{th}$ zoom region of the immersive media in a target zoom mode, i being a positive integer. For example, metadata of the immersive media is obtained. The metadata can include (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled.

In step S302, perform zoom processing on the $i^{th}$ zoom region of the immersive media according to the media file format data box. For example, zoom processing is performed on the zoom region of the immersive media according to the zoom mode information included in the metadata when the zoom mode information indicates that the target zoom mode is enabled for the zoom region.

In steps S301 and S302, for the syntax of the media file format data box of the immersive media, reference may be made to Table 6 above. The target zoom mode refers to performing zoom processing on the $i^{th}$ zoom region according to a zoom policy when the $i^{th}$ zoom region in the immersive media satisfies a zoom condition (e.g., a playback progress of the immersive media reaches a preset position, or a field of view of the user turns to the preset region). The zoom policy is generated according to zoom information specified by an immersive media content producer. For example, assuming that the zoom information specified by the immersive media content producer is that when the field of view of the user turns to the $i^{th}$ zoom region, the $i^{th}$ zoom region is enlarged to 2 times the original size of the $i^{th}$ zoom region, the zoom policy corresponding to the zoom information carries position information (e.g., coordinates) of the $i^{th}$ zoom region, a zoom condition, size information (a width and a height) and a zoom ratio.

In an implementation, the media file format data box may be an ISO base media file format (ISOBMFF) data box, and the target zoom mode may be a director zoom mode.

Before zoom processing is performed on the $i^{th}$ zoom region of the immersive media according to the media file format data box, a zoom description signaling file of the immersive media may be obtained first, the zoom description signaling file including description information of the zoom policy. The zoom description signaling file includes at least one of the following: a sphere region zooming descriptor or a 2D region zooming descriptor. The sphere region zooming descriptor is encapsulated in a representation hierarchy in a media presentation description file in the immersive media, and a quantity of the sphere region zooming descriptors in the representation hierarchy is less than or equal to 1. For the syntax of the sphere region zooming descriptor, reference may be made to Table 7. The 2D region zooming descriptor is encapsulated in a representation hierarchy in a media presentation description file in the immersive media, and a quantity of the 2D region zooming descriptors in the representation hierarchy is less than or equal to 1. For the syntax of the 2D region zooming descriptor, reference may be made to Table 8. After the user enables the target zoom mode, the content playback device presents the immersive media file according to the zoom description signaling file and the media file format data box of the immersive media.

In the embodiments of this disclosure, a media file format data box of immersive media is obtained, the media file format data box including a zoom policy of the $i^{th}$ zoom region of the immersive media in a target zoom mode, i being a positive integer; and zoom processing is performed on the $i^{th}$ zoom region of the immersive media according to the media file format data box. In view of the above, in the target zoom mode, a content playback device does not need to request videos of all zoom resolution versions, thereby saving the transmission bandwidth.

FIG. 4 is a flowchart of another data processing method for immersive media according to an exemplary embodiment of this disclosure. The method may be performed by the content production device in the immersive media system. The method includes the following steps S401 to S403:

In step S401, obtain zoom information of immersive media.

The zoom information is generated according to an intention of a content producer. For example, the content producer can perform zoom processing on the immersive media in a production procedure. In an implementation, the content producer may first perform zoom processing on the $i^{th}$ zoom region of the immersive media, for example, first zoom out on the $i^{th}$ zoom region for a few minutes, and then zoom in for a few minutes, or zoom out a few times, then zoom in a few times, and so on, and then, specify the zoom information according to a zoom effect of the zoom processing performed on the $i^{th}$ zoom region. Alternatively, when the content producer determines the resolution of immersive media, the content producer may directly specify zoom information according to the resolution without performing zoom processing on the $i^{th}$ zoom region of the immersive media first. The zoom information is used for indicating a corresponding zoom parameter when zoom processing is performed on the $i^{th}$ zoom region and includes, but is not limited to, a position or size (e.g., a width, a height, and coordinates) of the $i^{th}$ zoom region, a zoom step performed on the $i^{th}$ zoom region (e.g., zooming out and then zooming in), a zoom ratio (e.g., zooming out a few times or zooming in a few times), a duration of the zoom step (e.g., zooming out for a few minutes and then zooming in for a few minutes), and the like.

In step S402, configure a media file format data box of the immersive media according to the zoom information of the immersive media, the media file format data box including a zoom policy of the $i^{th}$ zoom region of the immersive media in a target zoom mode, i being a positive integer. For example, metadata of the immersive media is generated. The metadata can include (i) zoom region information of a zoom region of the immersive media, and (ii) zoom mode information that indicates whether a target zoom mode is enabled for the zoom region. The zoom mode information indicates zoom parameters of the target zoom mode for the zoom region when the target zoom mode is enabled.

With reference to Table 6 above, the configuration procedure of step S402 may include the following (1) to (4):

(1) The zoom policy includes a zoom flag field auto_zoom_flag. The zoom flag field is set to an effective value when the zoom information of the immersive media indicates that zoom processing needs to be performed on the $i^{th}$ zoom region in the target zoom mode. For example, a value of auto_zoom_flag is set to 1.

(2) The zoom policy includes a zoom step field zoom_steps. The zoom step field is set to m when the zoom information indicates that m zoom steps need to be performed when zoom processing is performed on the $i^{th}$ zoom region of the immersive media in the target zoom mode, m being a positive integer.

(3) When one zoom step corresponds to one zoom ratio field zoom_ratio, m zoom steps correspond to m zoom_ratio fields. The $j^{th}$ zoom step in the m zoom steps corresponds to the $j^{th}$ zoom ratio field in them zoom ratio fields zoom_ratio, j being a positive integer and j≤m. The $j^{th}$ zoom ratio field is set to an ineffective value when the zoom information indicates that a size of the $i^{th}$ zoom region of the immersive media after the $j^{th}$ zoom step of the zoom processing is performed thereon is the same as a size thereof before the zoom processing is performed thereon. The $j^{th}$ zoom ratio field is set to an effective value when the zoom information indicates that the size of the $i^{th}$ zoom region of the immersive media after the $j^{th}$ zoom step of the zoom processing is performed thereon is different from the size thereof before the zoom processing is performed thereon, the effective value being a ratio between the size of the $i^{th}$ zoom region after the $j^{th}$ zoom step of the zoom processing is performed thereon and the size thereof before the zoom processing is performed thereon. For example, if in the zoom information of the immersive media, the zoom information of the $j^{th}$ zoom step of the zoom processing performed on the $i^{th}$ zoom region indicates zooming in on the $i^{th}$ zoom region 2 times, a value of the $j^{th}$ zoom ratio field in the m zoom ratio fields may be set to 16.

(4) When one zoom step corresponds to one zoom duration zoom_duration and one unit of measure of the duration zoom duration unit, m zoom steps correspond to m zoom_duration fields and m zoom_duration unit fields. The $j^{th}$ zoom step corresponds to the $j^{th}$ zoom duration field and the $i^{th}$ zoom duration unit field, j being positive integer and j≤m. A value of a duration when the $j^{th}$ zoom step is performed on the $i^{th}$ zoom region as indicated in the zoom information is set as a value of the $j^{th}$ zoom duration field. A unit of measure of the duration when the $j^{th}$ zoom step is performed on the $i^{th}$ zoom region as indicated in the zoom information is set as a value of the $i^{th}$ zoom duration unit field. For example, when the zoom information of the immersive media indicates zooming in on the $i^{th}$ zoom region for 3 minutes when the $j^{th}$ zoom step of the zoom processing is performed on the $i^{th}$ zoom region, a value of a duration of the $j^{th}$ zoom step in the m zoom duration fields is set to 3, and a value of a duration unit field of the $j^{th}$ zoom step in the m zoom duration unit fields is set to 60.

In addition, a zoom description signaling file of the immersive media may be further configured according to the zoom information, the zoom description signaling file including description information of the zoom policy. For the syntax of the zoom description signaling file, reference may be made to Table 7 and Table 8. For a mode of configuring the extended fields in the zoom description signaling file, reference may be made to the foregoing mode of configuring the corresponding fields in the media file format data box, and details are not described herein again.

The solution of this embodiment of this disclosure is explained below in detail using an example: Zoom information specified by an immersive media content producer for a video A is as follows: zoom on a region B from the $10^{th}$ minute to the $20^{th}$ minute (00:10:00 to 00:20:00) of the video A. The region B is enlarged to 2 times an original size from the $10^{th}$ minute to the $13^{th}$ minute (00:10:00-00:13:00), the region B is restored to the original size from the $13^{th}$ minute to the $17^{th}$ minute (00:13:00-00:17:00), and the region B is enlarged to 4 times the original size from the $17^{th}$ minute to the $20^{th}$ minute (00:17:00-00:20:00). Therefore, the content production device sets, according to the zoom information specified by the content producer for the video A, a value of a zoom flag field to 1 and a value of a zoom step field to 3. A value of a zoom ratio field of a zoom step 1 is set to 16 ($16\times2^{-3}=2$), a value of a duration field is set to 3, and a value of a duration unit field is set to 60. It is to be understood that a mode of calculating a duration is 3×60 s=180 s, that is, 3 minutes. Similarly, a value of a zoom ratio field of a zoom step 2 is set to 0, a value of a duration field is set to 4, and a value of a duration unit field is set to 60. A value of a zoom ratio field of a zoom step 3 is set to 32, a value of a duration field is set to 3, and a value of a duration unit field is set to 60.

The content production device may, according to the zoom information specified by the content producer, media file format data boxes at various resolutions and corresponding zoom description signaling files for the immersive media. For example, the content production device configures, according to the zoom information specified by the content producer, a media file format data box 1 and a zoom description signaling file 1 at a 4K resolution (4096×2160 pixels) for the video A, which are used for indicating that the video A presents a zoom effect of "zoom in by 2 times→original size→zoom in by 4 times" when zoom processing is performed on the video A at the 4K resolution. In addition, the content production device configures a media file format data box 2 and a zoom description signaling file 2 at a 2K resolution for the video A, which are used for indicating that the video A presents a zoom effect of "zoom in by 1.5 times→original size→zoom in by 3 times" when zoom processing is performed on the video A at the 2K resolution.

In step S403, add the media file format data box of the immersive media into an encapsulated file of the immersive media. For example, the metadata of the immersive media is added into an encapsulated file of the immersive media.

In an implementation, the content production device adds immersive media with the same content but different resolutions and media file format data boxes corresponding thereto respectively to encapsulated files of the immersive media.

In some embodiments, the content production device may package all the media file format data boxes of the immersive media at different resolutions, and send the packaged file to the content playback device, so that the content playback device requests a corresponding encapsulated file according to a current resolution and the packaged file.

In the embodiments of this disclosure, the content production device configures a media file format data box according to immersive media and zoom information of the immersive media, and adds the media file format data box of the immersive media into an encapsulated file of the immersive media. Therefore, a content playback device can request, according to the media file format data box, a video file corresponding to a target zoom mode at a current resolution from a server and consume it without requesting videos of all zoom resolution versions, thereby saving the transmission bandwidth.

FIG. 5 is a flowchart of another data processing method for immersive media according to an exemplary embodiment of this disclosure. The method may be performed by the content playback device in the immersive media system. The method includes the following steps S501 to S503:

In step S501, obtain an encapsulated file of immersive media, the encapsulated file including a media file format data box of the immersive media, the media file format data box including a zoom policy of the $i^{th}$ zoom region of the immersive media in a target zoom mode, i being a positive integer.

In step S502, parse the encapsulated file, and display the parsed immersive media.

In an implementation, the content playback device first decapsulates the encapsulated file, to obtain an encoded file of the immersive media and the media file format data box of the immersive media, and then decodes and displays the encoded file of the immersive media.

In step S503, perform zoom processing on the $i^{th}$ zoom region of the immersive media according to the media file format data box in response to displaying the $i^{th}$ zoom region of the immersive media.

With reference to Table 6 above, the zoom processing procedure of step S503 may include the following (1)-(4):

(1) The zoom policy includes a zoom flag field auto_zoom_flag. The content playback device performs zoom processing on the $i^{th}$ zoom region of the immersive media in the target zoom mode when a value of the zoom flag field is an effective value. The zoom processing may be requesting, from a server, and displaying a video corresponding to a size of the $i^{th}$ zoom region after the zoom processing is performed thereon.

(2) The zoom policy includes a zoom step field zoom steps. Zoom processing is performed on the $i^{th}$ zoom region of the immersive media m times in the target zoom mode when a value of the zoom step field is m, m being a positive integer. For example, the content playback device needs to perform zoom processing on the $i^{th}$ zoom region of the immersive media 3 times in the target zoom mode when a value of the zoom step field is 3.

(3) When one zoom step corresponds to one zoom ratio field zoom_ratio, m zoom steps correspond to m zoom_ratio fields. The $j^{th}$ zoom step in the m zoom steps corresponds to the $j^{th}$ zoom ratio field in the m zoom ratio fields zoom_ratio, j being a positive integer and j≤m. When a value of the $i^{th}$ zoom ratio field is an ineffective value, a size of the $i^{th}$ zoom region is scaled in the target zoom mode to a size of the $i^{th}$ zoom region before the zoom processing is performed thereon. When the value of the $i^{th}$ zoom ratio field is an effective value, the $j^{th}$ zoom step of the zoom processing is performed on the $i^{th}$ zoom region of the immersive media in the target zoom mode according to the effective value, to make a ratio between the size of the $i^{th}$ zoom region of the immersive media after the $j^{th}$ zoom step is performed thereon and the size of the $i^{th}$ zoom region of the immersive media before the zoom processing is performed thereon reach the effective value.

(4) When one zoom step corresponds to one zoom duration zoom_duration and one unit of measure of the duration zoom duration unit, m zoom steps correspond to m zoom durations and m units of measure of the durations. The $j^{th}$ zoom step corresponds to the $j^{th}$ zoom duration field and the $i^{th}$ zoom duration unit field, j being positive integer and j≤m. The $j^{th}$ zoom step of the zoom processing is performed on the $i^{th}$ zoom region of the immersive media in the target zoom mode. The duration of the $j^{th}$ zoom step is indicated by both the $j^{th}$ zoom duration field and the $j^{th}$ zoom duration unit field. It is to be understood that, within the zoom duration, the content playback device continuously performs zoom processing on an image in the $i^{th}$ zoom region of the immersive media until the end of the zoom duration. For example, when the immersive media displays a total of 20 frames of images within the zoom duration, the content playback device performs zoom processing on the $i^{th}$ zoom regions of the 20 frames of images and displays them.

In addition, the content playback device can obtain an MPD file of the immersive media before obtaining the encapsulated file of the immersive media. The MPD file includes zoom description signaling files at various resolutions. The content playback device obtains an encapsulated file corresponding to a current resolution on the side of the content playback device, and presents a zoom effect of the immersive media in the encapsulated file according to the implementation of the foregoing step (1) to step (4).

The solution of this embodiment of this disclosure is explained below in further detail using an example: It is assumed that both a user 1 and a user 2 have selected the director zoom mode; a basic resolution consumed by the user 1 is 4K, and the user 1 requests, from a server, a video file corresponding to a 4K resolution under a representation hierarchy of starting the director zoom mode; and a basic resolution consumed by the user 2 is 2K, and the user 2 requests, from the server, a video file corresponding to a 2K resolution under a representation hierarchy of starting the director zoom mode. The server receives the requests from the user 1 and the user 2, encapsulates the video files corresponding to the 2K resolution and the 4K resolution respectively, and pushes them to the user 1 and the user 2. An encapsulated file 1 of the immersive media received by user 1 includes:

auto_zoom_flag=1; zoom_steps=3;

step1: zoom_ratio=16; zoom_duration=3; zoom_duration_unit=60;

step2: zoom_ratio=0; zoom_duration=4; zoom_duration_unit=60;

step3: zoom_ratio=32; zoom_duration=3; zoom_duration_unit=60;

An encapsulated file 2 of the immersive media received by user 2 includes:

auto_zoom_flag=1; zoom_steps=3;

step1: zoom_ratio=12; zoom_duration=3; zoom_duration_unit=60;

step2: zoom_ratio=0; zoom_duration=4; zoom_duration_unit=60;

step3: zoom_ratio=24; zoom_duration=3; zoom_duration_unit=60;

In addition, the encapsulated file 1 of the immersive media and the encapsulated file 2 of the immersive media received by the user 1 and the user 2 may further include position information and size information of a zoom region i, and a condition for performing zoom processing. Assuming that the condition for performing zoom processing is to perform zoom processing on the zoom region i when a playback progress reaches the $10^{th}$ minute, a content playback device 1 used by the user 1 enlarges the zoom region i to 2 times an original size thereof from the $10^{th}$ minute to the $13^{th}$ minute (00:10:00-00:13:00), restores the zoom region i to the original size from the $13^{th}$ minute to the $17^{th}$ minute (00:13:00-00:17:00), enlarges the zoom region i from the $17^{th}$ minutes to $20^{th}$ minutes (00:17:00-00:20:00) to 4 times the original size, and ends the zoom processing at the $20^{th}$ minute (00:20:00). Similarly, a content playback device 2 used by the user 2 enlarges the zoom region i to 1.5 times an original size thereof from the $10^{th}$ minute to the $13^{th}$ minute (00:10:00-00:13:00), restores the zoom region i to the original size from the $13^{th}$ minute to the $17^{th}$ minute (00:13:00-00:17:00), enlarges the zoom region i from the $17^{th}$ minutes to $20^{th}$ minutes (00:17:00-00:20:00) to 3 times the original size, and ends the zoom processing at the $20^{th}$ minute (00:20:00).

In the embodiments of this disclosure, the content playback device parses an encapsulated file of immersive media to obtain a media file format data box of the immersive media, and zoom processing is performed on the $i^{th}$ zoom region of the immersive media according to the media file format data box. In view of the above, in the target zoom mode, a content playback device does not need to request videos of all zoom resolution versions, thereby saving the transmission bandwidth. In addition, when the content playback device consumes a video file corresponding to a target zoom mode at a current resolution, the content playback device automatically presents, according to the target zoom mode, a zoom effect specified by an immersive media content producer, so that a user can obtain an improved viewing experience.

The method in the embodiments of this disclosure is described in detail above. For ease of better implementing the foregoing solutions in the embodiments of this disclosure, an apparatus in an embodiment of this disclosure is correspondingly provided in the following.

Figure 6:
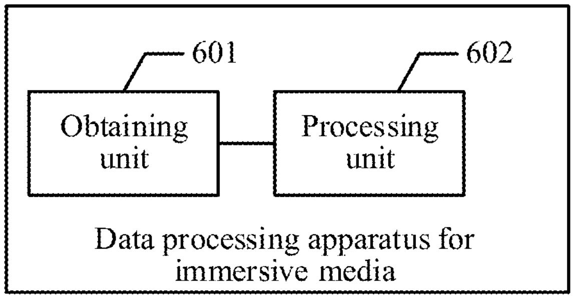
FIG. 6 is a schematic structural diagram of a data processing apparatus for immersive media according to an embodiment of this disclosure.

FIG. 6 is a schematic structural diagram of a data processing apparatus for immersive media according to an exemplary embodiment of this disclosure. The data processing apparatus for immersive media may be a computer program (including program code) run on a content production device. For example, the data processing apparatus for immersive media may be application software on a content production device. As shown in FIG. 6, the data processing apparatus for immersive media includes an obtaining unit 601 and a processing unit 602. One or more modules, submodules, and/or units of the apparatus can be implemented by processing circuitry, software, or a combination thereof, for example.

In an exemplary embodiment, the data processing apparatus for immersive media may be configured to perform the corresponding steps in the method shown in FIG. 3.

The obtaining unit 601 is configured to obtain a media file format data box of immersive media, the media file format data box including a zoom policy of the $i^{th}$ zoom region of the immersive media in a target zoom mode, i being a positive integer.

The processing unit 602 is configured to perform zoom processing on the $i^{th}$ zoom region of the immersive media according to the media file format data box.

In an implementation, the media file format data box includes an international organization for standardization base media file format data box; and the target zoom mode includes a director zoom mode.

In an implementation, the zoom policy includes a zoom flag field.

When a value of the zoom flag field is an effective value, the zoom flag field is used for indicating that zoom processing needs to be performed on the $i^{th}$ zoom region of the immersive media in the target zoom mode.

In an implementation, the zoom policy includes a zoom step field, a value of the zoom step field being m, m being a positive integer. The zoom step field is used for indicating that a quantity of zoom steps included when the zoom processing is performed on the $i^{th}$ zoom region of the immersive media in the target zoom mode is m.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m.

The $j^{th}$ zoom ratio field is used for indicating a zoom ratio adopted when the $j^{th}$ zoom step in the zoom processing is performed on the $i^{th}$ zoom region of the immersive media. The zoom ratio is in unit of 2 to 3.

When a value of the $j^{th}$ zoom ratio field is an ineffective value, the $j^{th}$ zoom ratio field is used for indicating that a size of the $i^{th}$ zoom region of the immersive media after the $j^{th}$ zoom step of the zoom processing is performed in the target zoom mode thereon is the same as a size thereof before the zoom processing is performed thereon.

When the value of the $j^{th}$ zoom ratio field is an effective value, the $j^{th}$ zoom ratio field is used for indicating that a ratio between the size of the $i^{th}$ zoom region of the immersive media after the $j^{th}$ zoom step of the zoom processing is performed in the target zoom mode thereon and the size thereof before the zoom processing is performed thereon is the value of the $j^{th}$ zoom ratio field.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m.

The $j^{th}$ zoom duration field is used for indicating a value of a duration when the $j^{th}$ zoom step of the zoom processing is performed on the $i^{th}$ zoom region of the immersive media, the zoom duration field being a non-zero value.

The $j^{th}$ zoom duration unit field is used for indicating a unit of measure of the duration when the $j^{th}$ zoom step of the zoom processing is performed on the $i^{th}$ zoom region of the immersive media, the unit of measure being in unit of second, and the zoom duration unit field being a non-zero value.

In an implementation, the obtaining unit 601 is further configured to obtain a zoom description signaling file of the immersive media, the zoom description signaling file including description information of the zoom policy.

In an implementation, the zoom description signaling file includes at least one of the following: a sphere region zooming descriptor or a 2D region zooming descriptor.

The sphere region zooming descriptor is encapsulated in a representation hierarchy in a media presentation description file in the immersive media, and a quantity of the sphere region zooming descriptors in the representation hierarchy is less than or equal to 1.

The 2D region zooming descriptor is encapsulated in the representation hierarchy in the media presentation description file in the immersive media, and a quantity of the 2D region zooming descriptors in the representation hierarchy is less than or equal to 1.

In some embodiments, the data processing apparatus for immersive media may be configured to perform the corresponding steps in the method shown in FIG. 4.

The obtaining unit 601 is configured to obtain zoom information of immersive media.

The processing unit 602 is configured to configure a media file format data box of the immersive media according to the zoom information of the immersive media, the media file format data box including a zoom policy of the $i^{th}$ zoom region of the immersive media in a target zoom mode, i being a positive integer; and add the media file format data box of the immersive media into an encapsulated file of the immersive media.

In an implementation, the zoom policy includes a zoom flag field. The processing unit 602 is further configured to configure a media file format data box of the immersive media according to the zoom information of the immersive media, for example set the zoom flag field to an effective value when the zoom information indicates that zoom processing needs to be performed on the $i^{th}$ zoom region of the immersive media in the target zoom mode.

In an implementation, the zoom policy includes a zoom step field. The processing unit 602 is further configured to configure a media file format data box of the immersive media according to the zoom information of the immersive media, for example set the zoom step field to m when the zoom information indicates that m zoom steps need to be performed when zoom processing is performed on the $i^{th}$ zoom region of the immersive media in the target zoom mode, m being a positive integer.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m. The processing unit 602 is further configured to configure a media file format data box of the immersive media according to the zoom information of the immersive media, for example:

set the $j^{th}$ zoom ratio field to an ineffective value when the zoom information indicates that a size of the $i^{th}$ zoom region of the immersive media after the $j^{th}$ zoom step of the zoom processing is performed thereon is the same as a size thereof before the zoom processing is performed thereon; and set the $j^{th}$ zoom ratio field to an effective value when the zoom information indicates that the size of the $i^{th}$ zoom region of the immersive media after the $j^{th}$ zoom step of the zoom processing is performed thereon is different the size thereof before the zoom processing is performed thereon, the effective value being a ratio between the size of the $i^{th}$ zoom region after the $j^{th}$ zoom step of the zoom processing is performed thereon and the size thereof before the zoom processing is performed thereon.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m. The processing unit 602 is further configured to configure a media file format data box of the immersive media according to the zoom information of the immersive media, for example set a value of a duration when the $j^{th}$ zoom step is performed on the $i^{th}$ zoom region as indicated in the zoom information as a value of the $j^{th}$ zoom duration field; and set a unit of measure of the duration when the $j^{th}$ zoom step is performed on the $i^{th}$ zoom region as indicated in the zoom information as a value of the $j^{th}$ zoom duration unit field.

In an implementation, the processing unit 602 is further configured to configure a zoom description signaling file of the immersive media according to the zoom information, the zoom description signaling file including description information of the zoom policy. The processing unit 602 is further configured to encapsulate the zoom description signaling file into a representation hierarchy in the media presentation description file in the immersive media.

According to an embodiment of the present disclosure, the units of the data processing apparatus for immersive media shown in FIG. 6 may be separately or wholly combined into one or several other units, or one (or more) of the units herein may further be divided into multiple units of smaller functions. In this way, same operations can be implemented, and implementation of the technical effects of this embodiment of the present disclosure is not affected. The foregoing units are divided based on logical functions. In an actual application, a function of one unit may also be implemented by a plurality of units, or functions of a plurality of units are implemented by one unit. In other embodiments of this disclosure, the data processing apparatus for immersive media may also include other units. During actual application, the functions may also be cooperatively implemented by other units and may be cooperatively implemented by a plurality of units. According to another embodiment of this disclosure, a computer program (including program code) that can perform the steps in the corresponding method shown in FIG. 3 or FIG. 4 may be run on a general-purpose computing device, such as a computer, which includes processing elements (e.g., processing circuitry) and storage elements such as a central processing unit (CPU), a random access memory (RAM), and a read-only memory (ROM), to construct the data processing apparatus for immersive media shown in FIG. 3 or FIG. 4 and implement the data processing method for immersive media in the embodiments of this disclosure. The computer program may be recorded on, for example, a computer-readable recording medium (e.g., non-transitory computer-readable storage medium), and may be loaded into the foregoing computing device by using the computer-readable recording medium and run on the computing device.

Based on the same concept, a principle and beneficial effects of resolving a problem by the data processing apparatus for immersive media provided in the embodiments of this disclosure are similar to a principle and beneficial effects of resolving a problem by the data processing method for immersive media in the embodiments of this disclosure. Reference may be made to the principle and beneficial effects of the implementation of the method. For brevity, details are not described herein again.

Figure 7:
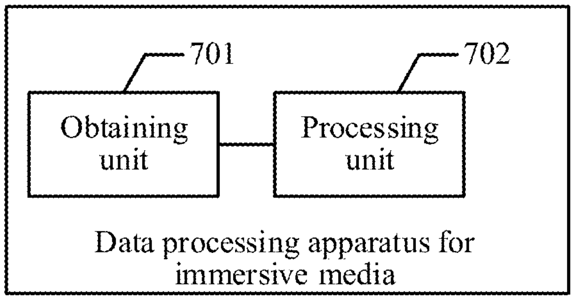
FIG. 7 is a schematic structural diagram of another data processing apparatus for immersive media according to an embodiment of this disclosure.

FIG. 7 is a schematic structural diagram of another data processing apparatus for immersive media according to an exemplary embodiment of this disclosure. The data processing apparatus for immersive media may be a computer program (including program code) run on a content playback device. For example, the data processing apparatus for immersive media may be application software on a content playback device. As shown in FIG. 7, the data processing apparatus for immersive media includes an obtaining unit 701 and a processing unit 702. One or more modules, submodules, and/or units of the apparatus can be implemented by processing circuitry, software, or a combination thereof, for example.

In an exemplary embodiment, the data processing apparatus for immersive media may be configured to perform the corresponding steps in the method shown in FIG. 3.

The obtaining unit 701 is configured to obtain a media file format data box of immersive media, the media file format data box including a zoom policy of the $i^{th}$ zoom region of the immersive media in a target zoom mode, i being a positive integer.

The processing unit 702 is configured to perform zoom processing on the $i^{th}$ zoom region of the immersive media according to the media file format data box.

In an implementation, the media file format data box includes an international organization for standardization base media file format data box. The target zoom mode includes a director zoom mode.

In an implementation, the zoom policy includes a zoom flag field.

When a value of the zoom flag field is an effective value, the zoom flag field is used for indicating that zoom processing needs to be performed on the $i^{th}$ zoom region of the immersive media in the target zoom mode.

In an implementation, the zoom policy includes a zoom step field, a value of the zoom step field being m, m being a positive integer. The zoom step field is used for indicating that a quantity of zoom steps included when the zoom processing is performed on the $i^{th}$ zoom region of the immersive media in the target zoom mode is m.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m.

The $j^{th}$ zoom ratio field is used for indicating a zoom ratio adopted when the $j^{th}$ zoom step in the zoom processing is performed on the $i^{th}$ zoom region of the immersive media. The zoom ratio is in unit of 2 to 3.

When a value of the $j^{th}$ zoom ratio field is an ineffective value, the $j^{th}$ zoom ratio field is used for indicating that a size of the $i^{th}$ zoom region of the immersive media after the $j^{th}$ zoom step of the zoom processing is performed in the target zoom mode thereon is the same as a size thereof before the zoom processing is performed thereon.

When the value of the $j^{th}$ zoom ratio field is an effective value, the $j^{th}$ zoom ratio field is used for indicating that a ratio between the size of the $i^{th}$ zoom region of the immersive media after the $j^{th}$ zoom step of the zoom processing is performed in the target zoom mode thereon and the size thereof before the zoom processing is performed thereon is the value of the $i^{th}$ zoom ratio field.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m.

The $j^{th}$ zoom duration field is used for indicating a value of a duration when the $j^{th}$ zoom step of the zoom processing is performed on the $i^{th}$ zoom region of the immersive media, the zoom duration field being a non-zero value.

The $j^{th}$ zoom duration unit field is used for indicating a unit of measure of the duration when the $j^{th}$ zoom step of the zoom processing is performed on the $i^{th}$ zoom region of the immersive media, the unit of measure being in unit of second, and the zoom duration unit field being a non-zero value.

In an implementation, the obtaining unit 701 is further configured to obtain a zoom description signaling file of the immersive media, the zoom description signaling file including description information of the zoom policy.

In an implementation, the zoom description signaling file includes at least one of the following: a sphere region zooming descriptor or a 2D region zooming descriptor.

The sphere region zooming descriptor is encapsulated in a representation hierarchy in a media presentation description file in the immersive media, and a quantity of the sphere region zooming descriptors in the representation hierarchy is less than or equal to 1.

The 2D region zooming descriptor is encapsulated in the representation hierarchy in the media presentation description file in the immersive media, and a quantity of the 2D region zooming descriptors in the representation hierarchy is less than or equal to 1.

In some embodiments, the data processing apparatus for immersive media may be configured to perform the corresponding steps in the method shown in FIG. 5.

The obtaining unit 701 is configured to obtain an encapsulated file of immersive media, the encapsulated file including a media file format data box of the immersive media, the media file format data box including a zoom policy of the $i^{th}$ zoom region of the immersive media in a target zoom mode, i being a positive integer.

The processing unit 702 is configured to parse the encapsulated file, and displaying the parsed immersive media; and perform zoom processing on the $i^{th}$ zoom region of the immersive media according to the media file format data box in response to displaying the $i^{th}$ zoom region of the immersive media.

In an implementation, the zoom policy includes a zoom flag field. The processing unit 702 is further configured to perform zoom processing on the $i^{th}$ zoom region of the immersive media according to the media file format data box, for example perform zoom processing on the $i^{th}$ zoom region of the immersive media in the target zoom mode when a value of the zoom flag field is an effective value.

In an implementation, the zoom policy includes a zoom step field, a value of the zoom step field being m, m being a positive integer. The processing unit 702 is further configured to perform zoom processing on the $i^{th}$ zoom region of the immersive media according to the media file format data box, for example perform zoom processing on the $i^{th}$ zoom region of the immersive media in the target zoom mode m times.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m. The processing unit 702 is further configured to perform zoom processing on the $i^{th}$ zoom region of the immersive media according to the media file format data box, for example:

perform the $j^{th}$ zoom step of the zoom processing on the $i^{th}$ zoom region of the immersive media in the target zoom mode when a value of the $j^{th}$ zoom ratio field is an ineffective value, to make a size of the $i^{th}$ zoom region of the immersive media after the $j^{th}$ zoom step of the zoom processing is performed thereon the same as a size of the $i^{th}$ zoom region of the immersive media before the zoom processing is performed thereon; and perform, when the value of the $j^{th}$ zoom ratio field is an effective value, the $j^{th}$ zoom step of the zoom processing on the $i^{th}$ zoom region of the immersive media in the target zoom mode according to the effective value, to make a ratio between the size of the $i^{th}$ zoom region of the immersive media after the $j^{th}$ zoom step is performed thereon and the size of the $i^{th}$ zoom region of the immersive media before the zoom processing is performed thereon reach the effective value.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m. The processing unit 702 is further configured to perform zoom processing on the $i^{th}$ zoom region of the immersive media according to the media file format data box, for example perform the $j^{th}$ zoom step of the zoom processing on the $i^{th}$ zoom region of the immersive media in the target zoom mode according to a common indication of the $j^{th}$ zoom duration field and the $j^{th}$ zoom duration unit field.

In an implementation, the processing unit 702 is further configured to obtain a zoom description signaling file of the immersive media, the zoom description signaling file including description information of the zoom policy. The obtaining unit 701 is further configured to obtain an encapsulated file of immersive media, for example obtain an encapsulated file of the immersive media according to the zoom description signaling file.

According to an embodiment of the present disclosure, the units of the data processing apparatus for immersive media shown in FIG. 7 may be separately or wholly combined into one or several other units, or one (or more) of the units herein may further be divided into multiple units of smaller functions. In this way, same operations can be implemented, and implementation of the technical effects of this embodiment of the present disclosure is not affected. The foregoing units are divided based on logical functions. In an actual application, a function of one unit may also be implemented by a plurality of units, or functions of a plurality of units are implemented by one unit. In other embodiments of this disclosure, the data processing apparatus for immersive media may also include other units. During actual application, the functions may also be cooperatively implemented by other units and may be cooperatively implemented by a plurality of units. According to another embodiment of this disclosure, a computer program (including program code) that can perform the steps in the corresponding method shown in FIG. 3 or FIG. 5 may be run on a general-purpose computing device, such as a computer, which includes processing elements (e.g., processing circuitry) and storage elements such as a central processing unit (CPU), a random access memory (RAM), and a read-only memory (ROM), to construct the data processing apparatus for immersive media shown in FIG. 3 or FIG. 5 and implement the data processing method for immersive media in the embodiments of this disclosure. The computer program may be recorded on, for example, a computer-readable recording medium (e.g., a non-transitory computer-readable storage medium), and may be loaded into the foregoing computing device by using the computer-readable recording medium and run on the computing device.

Based on the same concept, a principle and beneficial effects of resolving a problem by the data processing apparatus for immersive media provided in the embodiments of this disclosure are similar to a principle and beneficial effects of resolving a problem by the data processing method for immersive media in the embodiments of this disclosure. Reference may be made to the principle and beneficial effects of the implementation of the method. For brevity, details are not described herein again.

Figure 8:
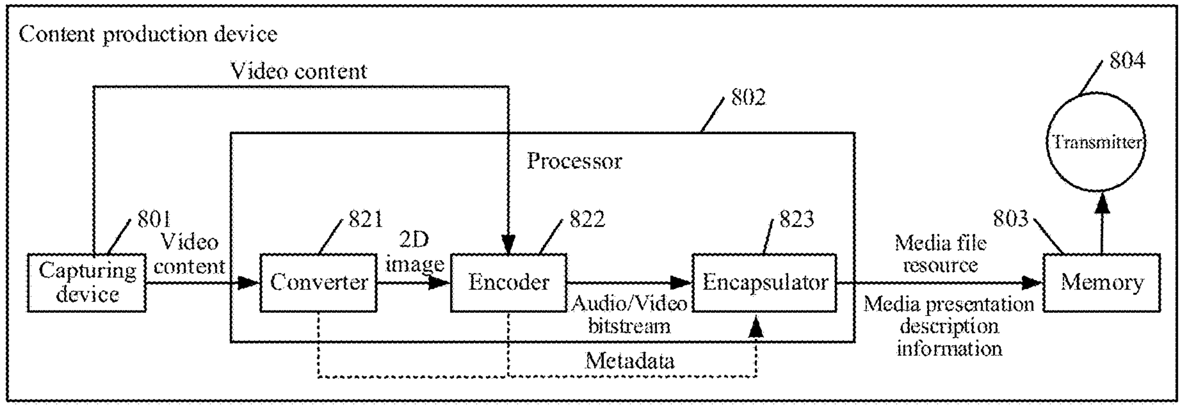
FIG. 8 is a schematic structural diagram of a content production device according to an embodiment of this disclosure.

FIG. 8 is a schematic structural diagram of a content production device according to an exemplary embodiment of this disclosure. The content production device may be a computer device used by a provider of immersive media. The computer device may be a terminal (such as a PC or an intelligent mobile device (such as a smartphone)) or a server. As shown in FIG. 8, the content production device includes a capturing device 801, a processor 802, a memory 803, and a transmitter 804. One or more modules, submodules, and/or units of the device can be implemented by processing circuitry, software, or a combination thereof, for example.

The capturing device 801 is configured to acquire sound-visual scene of a real world to obtain original data of immersive media (including audio content and video content synchronized temporally and spatially). The capturing device 801 may include, but is not limited to, an audio device, a camera device, and a sensing device. The audio device may include an audio sensor, a microphone, or the like. The camera device may include an ordinary camera, a stereo camera, a light field camera, or the like. The sensing device may include a laser device, a radar device, or the like.

Processing circuitry such as the processor 802 (or referred to as a central processing unit (CPU)) can include a processing core of a content production device. The processor 802 is adapted to implement one or more instructions, and is adapted to load and execute the one or more instructions to implement the data processing method for immersive media shown in FIG. 3 or FIG. 4.

The memory 803 is a memory device in the content production device, and is configured to store a program and a media resource. It may be understood that the memory 803 herein may include an internal storage medium in the content production device and certainly may also include an extended storage medium supported by the content production device. The memory 803 may be a high-speed RAM memory, or may be a non-volatile memory such as at least one magnetic disk storage, and optionally, may be at least one memory far away from the foregoing processor. The memory 803 provides a storage space. The storage space is configured to store an operating system of the content production device. In addition, the storage space is further configured to store a computer program. The computer program includes program instructions. In addition, the program instructions are adapted to be invoked and executed by the processor 802, to perform the steps of the data processing method for immersive media. In addition, the memory 803 may be further configured to store an immersive media file formed after processing performed by the processor. The immersive media file includes a media file resource and media presentation description information.

The transmitter 804 is configured to implement transmission and interaction between the content production device and another device, for example, implement transmission of immersive media between the content production device and a content playback device. That is, the content production device transmits a media resource related to the immersive media to the content playback device through the transmitter 804.

Referring to FIG. 8 again, the processor 802 may include a converter 821, an encoder 822, and an encapsulator 823.

The converter 821 is configured to perform a series of conversion on captured video content, so that the video content becomes content adapted to be video-encoded for immersive media. The conversion may include: concatenation and projection. In some embodiments, the conversion further includes region encapsulation. The converter 821 may converted captured 3D video content into a 2D image and provide the 2D image to the encoder 822 for video encoding.

The encoder 822 is configured to perform audio encoding on captured audio content to form an audio bitstream of the immersive media, and is further configured to perform video encoding on the 2D image obtained by the converter 821 through conversion, to obtain a video bitstream.

The encapsulator 823 is configured to encapsulate the audio bitstream and the video bitstream according to a file format of the immersive media (such as ISOBMFF) into a file container to form a media file resource of the immersive media. The media file resource may be a media file or a media segment that forms a media file of the immersive media; and record, according to requirements of the file format of the immersive media, metadata of the media file resource of the immersive media using media presentation description information. The encapsulated file of the immersive media obtained by the encapsulator 823 through processing is stored on the memory 803, and provided to the content playback device according to requirements for presentation of the immersive media.

In an exemplary embodiment, the processor 802 (e.g., elements included or implemented in the processor 802) performs the steps of the data processing method for immersive media shown in FIG. 3 by invoking one or more instructions on the memory 803. In some embodiments, the memory 803 stores one or more first instructions. The one or more first instructions are adapted to be loaded by the processor 802 to perform the following steps:

obtaining a media file format data box of immersive media, the media file format data box including a zoom policy of the $i^{th}$ zoom region of the immersive media in a target zoom mode, i being a positive integer; and performing zoom processing on the $i^{th}$ zoom region of the immersive media according to the media file format data box.

In an implementation, the media file format data box includes an international organization for standardization base media file format data box. The target zoom mode includes a director zoom mode.

In an implementation, the zoom policy includes a zoom flag field, and when a value of the zoom flag field is an effective value, the zoom flag field is used for indicating that zoom processing needs to be performed on the $i^{th}$ zoom region of the immersive media in the target zoom mode.

In an implementation, the zoom policy includes a zoom step field, a value of the zoom step field being m, m being a positive integer. The zoom step field is used for indicating that a quantity of zoom steps included when the zoom processing is performed on the $i^{th}$ zoom region of the immersive media in the target zoom mode is m.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m.

The $j^{th}$ zoom ratio field is used for indicating a zoom ratio adopted when the $j^{th}$ zoom step in the zoom processing is performed on the $i^{th}$ zoom region of the immersive media. The zoom ratio is in unit of 2 to 3.

When a value of the $j^{th}$ zoom ratio field is an ineffective value, the $j^{th}$ zoom ratio field is used for indicating that a size of the $i^{th}$ zoom region of the immersive media after the $j^{th}$ zoom step of the zoom processing is performed in the target zoom mode thereon is the same as a size thereof before the zoom processing is performed thereon.

When the value of the $j^{th}$ zoom ratio field is an effective value, the $j^{th}$ zoom ratio field is used for indicating that a ratio between the size of the $i^{th}$ zoom region of the immersive media after the $j^{th}$ zoom step of the zoom processing is performed in the target zoom mode thereon and the size thereof before the zoom processing is performed thereon is the value of the $j^{th}$ zoom ratio field.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m.

The $j^{th}$ zoom duration field is used for indicating a value of a duration when the $j^{th}$ zoom step of the zoom processing is performed on the $i^{th}$ zoom region of the immersive media, the zoom duration field being a non-zero value.

The $j^{th}$ zoom duration unit field is used for indicating a unit of measure of the duration when the $j^{th}$ zoom step of the zoom processing is performed on the $i^{th}$ zoom region of the immersive media, the unit of measure being in unit of second, and the zoom duration unit field being a non-zero value.

In an implementation, the computer program on the memory 803 is loaded by the processor 802 to further perform obtaining a zoom description signaling file of the immersive media, the zoom description signaling file including description information of the zoom policy.

In an implementation, the zoom description signaling file includes at least one of the following: a sphere region zooming descriptor or a 2D region zooming descriptor.

The sphere region zooming descriptor is encapsulated in a representation hierarchy in a media presentation description file in the immersive media, and a quantity of the sphere region zooming descriptors in the representation hierarchy is less than or equal to 1.

The 2D region zooming descriptor is encapsulated in the representation hierarchy in the media presentation description file in the immersive media, and a quantity of the 2D region zooming descriptors in the representation hierarchy is less than or equal to 1.

In some embodiments, the processor 802 (e.g., elements included or implemented in the processor 802) performs the steps of the data processing method for immersive media shown in FIG. 4 by invoking one or more instructions on the memory 803. In some embodiments, the memory 803 stores one or more second instructions. The one or more second instructions are adapted to be loaded by the processor 802 to perform the following steps:

obtaining zoom information of immersive media;

configuring a media file format data box of the immersive media according to the zoom information of the immersive media, the media file format data box including a zoom policy of the $i^{th}$ zoom region of the immersive media in a target zoom mode, i being a positive integer; and adding the media file format data box of the immersive media into an encapsulated file of the immersive media.

In an implementation, the zoom policy includes a zoom flag field. When the one or more second instructions are adapted to be loaded by the processor 802 to configure a media file format data box of the immersive media according to the zoom information of the immersive media, the following step is performed setting the zoom flag field to an effective value when the zoom information indicates that zoom processing needs to be performed on the $i^{th}$ zoom region of the immersive media in the target zoom mode.

In an implementation, the zoom policy includes a zoom step field. When the one or more second instructions are adapted to be loaded by the processor 802 to configure a media file format data box of the immersive media according to the zoom information of the immersive media, the following step is performed setting the zoom step field to m when the zoom information indicates that m zoom steps need to be performed when zoom processing is performed on the $i^{th}$ zoom region of the immersive media in the target zoom mode, m being a positive integer.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m. When the one or more second instructions are adapted to be loaded by the processor 802 to configure a media file format data box of the immersive media according to the zoom information of the immersive media, the following step is performed:

setting the $j^{th}$ zoom ratio field to an ineffective value when the zoom information indicates that a size of the $i^{th}$ zoom region of the immersive media after the $j^{th}$ zoom step of the zoom processing is performed thereon is the same as a size thereof before the zoom processing is performed thereon; and setting the $j^{th}$ zoom ratio field to an effective value when the zoom information indicates that the size of the $i^{th}$ zoom region of the immersive media after the $j^{th}$ zoom step of the zoom processing is performed thereon is different the size thereof before the zoom processing is performed thereon, the effective value being a ratio between the size of the $i^{th}$ zoom region after the $j^{th}$ zoom step of the zoom processing is performed thereon and the size thereof before the zoom processing is performed thereon.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m. When the one or more second instructions are adapted to be loaded by the processor 802 to configure a media file format data box of the immersive media according to the zoom information of the immersive media, the following steps are performed setting a value of a duration when the $j^{th}$ zoom step is performed on the $i^{th}$ zoom region as indicated in the zoom information as a value of the $j^{th}$ zoom duration field; and setting a unit of measure of the duration when the $j^{th}$ zoom step is performed on the $i^{th}$ zoom region as indicated in the zoom information as a value of the $j^{th}$ zoom duration unit field.

In an implementation, the computer program on the memory 803 is loaded by the processor 802 to further perform the following steps:

configuring a zoom description signaling file of the immersive media according to the zoom information, the zoom description signaling file including description information of the zoom policy; and encapsulating the zoom description signaling file into a representation hierarchy in the media presentation description file in the immersive media.

Based on the same concept, a principle and beneficial effects of resolving a problem by the data processing device for immersive media provided in the embodiments of this disclosure are similar to a principle and beneficial effects of resolving a problem by the data processing method for immersive media in the embodiments of this disclosure. Reference may be made to the principle and beneficial effects of the implementation of the method. For brevity, details are not described herein again.

Figure 9:
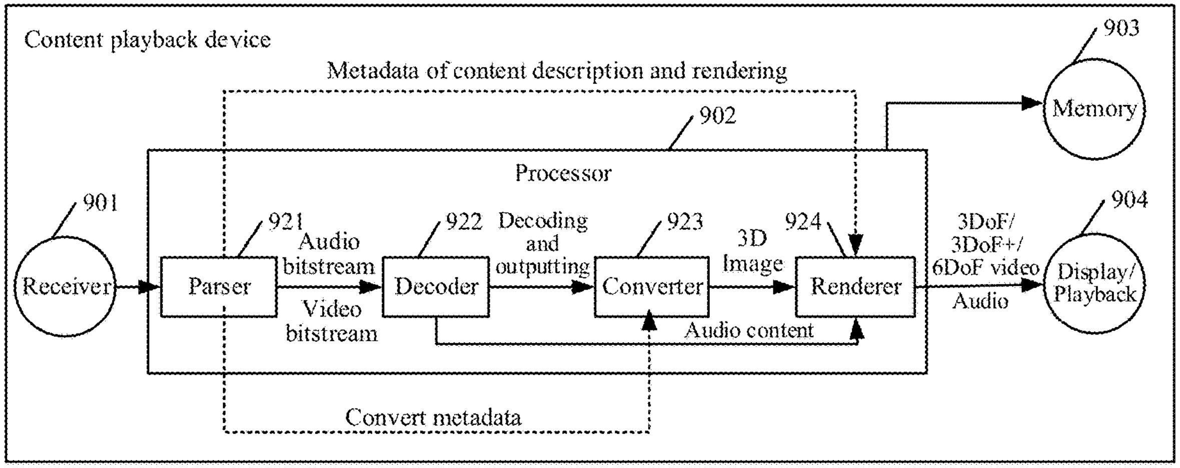
FIG. 9 is a schematic structural diagram of a content playback device according to an embodiment of this disclosure.

FIG. 9 is a schematic structural diagram of a content playback device according to an embodiment of this disclosure. The content playback device may be a computer device used by a user of immersive media. The computer device may be a terminal (such as a PC, an intelligent mobile device (such as a smartphone), or a VR device (such as a VR helmet or VR glasses)). As shown in FIG. 9, the content playback device includes a receiver 901, a processor 902, a memory 903, and a display/playback apparatus 904. One or more modules, submodules, and/or units of the device can be implemented by processing circuitry, software, or a combination thereof, for example.

The receiver 901 is configured to implement transmission and interaction with another device, for example, implement transmission of immersive media between a content production device and the content playback device. That is, the content playback device receives, through the receiver 901, a media resource related to the immersive media transmitted by the content production device.

Processing circuitry such as the processor 902 (or referred to as a central processing unit (CPU)) can include a processing core of a content production device. The processor 902 is adapted to implement one or more instructions, and is adapted to load and execute the one or more instructions to implement the data processing method for immersive media shown in FIG. 3 or FIG. 5.

The memory 903 is a memory device in the content playback device, and is configured to store a program and a media resource. It may be understood that the memory 903 herein may include an internal storage medium in the content playback device and certainly may also include an extended storage medium supported by the content playback device. The memory 903 may be a high-speed RAM memory, or may be a non-volatile memory such as at least one magnetic disk storage, and optionally, may be at least one memory far away from the foregoing processor. The memory 903 provides a storage space. The storage space is configured to store an operating system of the content playback device. In addition, the storage space is further configured to store a computer program. The computer program includes program instructions. In addition, the program instructions are adapted to be invoked and executed by the processor 802, to perform the steps of the data processing method for immersive media. In addition, the memory 903 may be further configured to store an 3D image of the immersive media after processing performed by the processor 902, audio content corresponding to the 3D image, information required for rendering the 3D image and the audio content, and the like.

The display/playback apparatus 904 is configured to output a sound and a 3D image obtained through rendering.

Referring to FIG. 9 again, the processor 902 may include a parser 921, a decoder 922, a converter 923, and a renderer 924.

The parser 921 is configured to perform file decapsulation on an encapsulated file of the immersive media from the content production device, for example, decapsulate a media file resource according to requirements of a file format of the immersive media, to obtain an audio bitstream and a video bitstream; and provide the audio bitstream and the video bitstream to the decoder 922.

The decoder 922 performs audio decoding on the audio bitstream to obtain audio content and provides the audio content to the renderer 924 for audio rendering. In addition, the decoder 922 decodes the video bitstream to obtain a 2D image. According to metadata provided in media presentation description information, when the metadata indicates that a region encapsulation procedure has been performed on the immersive media, the 2D image refers to an encapsulated image, and when the metadata indicates that no region encapsulation procedure has been performed on the immersive media, the 2D image refers to a projected image.

The converter 923 is configured to convert the 2D image into a 3D image. When a region encapsulation procedure has been performed on the immersive media, the converter 923 first performs region decapsulation on the encapsulated image to obtain a projected image, and then, performs reconstruction on the projected image to obtain a 3D image. When no region encapsulation procedure has been performed on the immersive media, the converter 923 directly performs reconstruction on the projected image to obtain a 3D image.

The renderer 924 is configured to render the audio content and the 3D image the immersive media. The audio content and the 3D image are rendered according to metadata related to rendering and a viewport in the media presentation description information, and are outputted by the display/playback apparatus 904 after the rendering is completed.

In an exemplary embodiment, the processor 902 (e.g., elements included or implemented in the processor 902) performs the steps of the data processing method for immersive media shown in FIG. 3 by invoking one or more instructions on the memory 903. In some embodiments, the memory 903 stores one or more first instructions. The one or more first instructions are adapted to be loaded by the processor 902 to perform the following steps:

obtaining a media file format data box of immersive media, the media file format data box including a zoom policy of the $i^{th}$ zoom region of the immersive media in a target zoom mode, i being a positive integer; and performing zoom processing on the $i^{th}$ zoom region of the immersive media according to the media file format data box.

an implementation, the media file format data box includes an international organization for standardization base media file format data box. The target zoom mode includes a director zoom mode.

In an implementation, the zoom policy includes a zoom flag field, and when a value of the zoom flag field is an effective value, the zoom flag field is used for indicating that zoom processing needs to be performed on the $i^{th}$ zoom region of the immersive media in the target zoom mode.

In an implementation, the zoom policy includes a zoom step field, a value of the zoom step field being m, m being a positive integer. The zoom step field is used for indicating that a quantity of zoom steps included when the zoom processing is performed on the $i^{th}$ zoom region of the immersive media in the target zoom mode is m.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and $j \leq m$.

The $j^{th}$ zoom ratio field is used for indicating a zoom ratio adopted when the $j^{th}$ zoom step in the zoom processing is performed on the $i^{th}$ zoom region of the immersive media. The zoom ratio is in unit of 2 to 3.

When a value of the $j^{th}$ zoom ratio field is an ineffective value, the $j^{th}$ zoom ratio field is used for indicating that a size of the $i^{th}$ zoom region of the immersive media after the $j^{th}$ zoom step of the zoom processing is performed in the target zoom mode thereon is the same as a size thereof before the zoom processing is performed thereon.

When the value of the $j^{th}$ zoom ratio field is an effective value, the $j^{th}$ zoom ratio field is used for indicating that a ratio between the size of the $i^{th}$ zoom region of the immersive media after the $j^{th}$ zoom step of the zoom processing is performed in the target zoom mode thereon and the size thereof before the zoom processing is performed thereon is the value of the $j^{th}$ zoom ratio field.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and $j \leq m$.

The $j^{th}$ zoom duration field is used for indicating a value of a duration when the $j^{th}$ zoom step of the zoom processing is performed on the $i^{th}$ zoom region of the immersive media, the zoom duration field being a non-zero value.

The $j^{th}$ zoom duration unit field is used for indicating a unit of measure of the duration when the $j^{th}$ zoom step of the zoom processing is performed on the $i^{th}$ zoom region of the immersive media, the unit of measure being in unit of second, and the zoom duration unit field being a non-zero value.

In an implementation, the computer program on the memory 903 is loaded by the processor 902 to further perform obtaining a zoom description signaling file of the immersive media, the zoom description signaling file including description information of the zoom policy.

In an implementation, the zoom description signaling file includes at least one of the following: a sphere region zooming descriptor or a 2D region zooming descriptor.

The sphere region zooming descriptor is encapsulated in a representation hierarchy in a media presentation description file in the immersive media, and a quantity of the sphere region zooming descriptors in the representation hierarchy is less than or equal to 1.

The 2D region zooming descriptor is encapsulated in the representation hierarchy in the media presentation description file in the immersive media, and a quantity of the 2D region zooming descriptors in the representation hierarchy is less than or equal to 1.

In some embodiments, the processor 902 (e.g., elements included or implemented in the processor 902) performs the steps of the data processing method for immersive media shown in FIG. 5 by invoking one or more instructions on the memory 903. In some embodiments, the memory 903 stores one or more second instructions. The one or more second instructions are adapted to be loaded by the processor 902 to perform the following steps:

obtaining an encapsulated file of immersive media, the encapsulated file including a media file format data box of the immersive media, the media file format data box including a zoom policy of the $i^{th}$ zoom region of the immersive media in a target zoom mode, i being a positive integer; and parsing the encapsulated file, and displaying the parsed immersive media; and performing zoom processing on the $i^{th}$ zoom region of the immersive media according to the media file format data box in response to displaying the $i^{th}$ zoom region of the immersive media.

In an implementation, the zoom policy includes a zoom flag field. In a case the one or more second instructions are adapted to be loaded by the processor 902 to perform zoom processing on the $i^{th}$ zoom region of the immersive media according to the media file format data box when a value of the zoom flag field is an effective value, performing zoom processing is performed on the $i^{th}$ zoom region of the immersive media in the target zoom mode m times.

In an implementation, the zoom policy includes a zoom step field, a value of the zoom step field being m, m being a positive integer. When the one or more second instructions are adapted to be loaded by the processor 902 to perform zoom processing on the $i^{th}$ zoom region of the immersive media according to the media file format data box, zoom processing is performed on the $i^{th}$ zoom region of the immersive media in the target zoom mode m times.

In an implementation, the zoom processing includes m zoom steps, m being a positive integer. The zoom policy includes m zoom ratio fields. The $j^{th}$ zoom step in the m zoom steps corresponds to the $j^{th}$ zoom ratio field in the m zoom ratio fields, j being a positive integer and j≤m. When the one or more second instructions are adapted to be loaded by the processor 902 to perform zoom processing on the $i^{th}$ zoom region of the immersive media according to the media file format data box, the following steps are performed:

performing the $j^{th}$ zoom step of the zoom processing on the $i^{th}$ zoom region of the immersive media in the target zoom mode when a value of the $j^{th}$ zoom ratio field is an ineffective value, to make a size of the $i^{th}$ zoom region of the immersive media after the $j^{th}$ zoom step of the zoom processing is performed thereon the same as a size of the $i^{th}$ zoom region of the immersive media before the zoom processing is performed thereon; and performing, when the value of the $j^{th}$ zoom ratio field is an effective value, the $j^{th}$ zoom step of the zoom processing on the $i^{th}$ zoom region of the immersive media in the target zoom mode according to the effective value, to make a ratio between the size of the $i^{th}$ zoom region of the immersive media after the $j^{th}$ zoom step is performed thereon and the size of the $i^{th}$ zoom region of the immersive media before the zoom processing is performed thereon reach the effective value.

In an implementation, the zoom processing includes m zoom steps, m being a positive integer. The zoom policy includes m zoom duration fields and m zoom duration unit fields. The $j^{th}$ zoom step in the m zoom steps corresponds to the $j^{th}$ zoom duration field in the m zoom duration fields and the $j^{th}$ zoom duration unit field in the m zoom duration unit fields, j being positive integer and j≤m. When the one or more second instructions are adapted to be loaded by the processor 902 to perform zoom processing on the $i^{th}$ zoom region of the immersive media according to the media file format data box, the $j^{th}$ zoom step of the zoom processing is performed on the $i^{th}$ zoom region of the immersive media in the target zoom mode according to a common indication of the $j^{th}$ zoom duration field and the $j^{th}$ zoom duration unit field.

In an implementation, the computer program on the memory 903 is loaded by the processor 902 to further perform obtaining a zoom description signaling file of the immersive media, the zoom description signaling file including description information of the zoom policy.

When the processor 902 obtains an encapsulated file of the immersive media through the receiver 901, an encapsulated file of the immersive media is obtained according to the zoom description signaling file.

Based on the same concept, a principle and beneficial effects of resolving a problem by the data processing device for immersive media provided in the embodiments of this disclosure are similar to a principle and beneficial effects of resolving a problem by the data processing method for immersive media in the embodiments of this disclosure. Reference may be made to the principle and beneficial effects of the implementation of the method. For brevity, details are not described herein again.

What is disclosed above are merely exemplary embodiments of this disclosure, and which are not intended to limit the scope of this disclosure. Other embodiments are within the scope of this disclosure.

What is claimed is:

1. A data processing method for immersive media, the method comprising:

obtaining metadata of the immersive media, the metadata including zoom region information indicating a zoom region of the immersive media and automatic zooming information associated with the zoom region, the automatic zooming information including:

zoom mode information indicating whether an automatic zooming mode is enabled for the zoom region, a step value indicating a number of automatic zooming steps to be sequentially performed when the automatic zooming mode is enabled, a respective zoom ratio for each of the automatic zooming steps, and a respective zoom duration for each of the automatic zooming steps;

obtaining, by processing circuitry, encoded data of the immersive media that corresponds to the zoom mode information when the zoom mode information included in the automatic zooming information indicates that the automatic zooming mode is enabled for the zoom region; and performing, by the processing circuitry, zoom processing sequentially on the zoom region of the immersive media during playback of the encoded data according to the automatic zooming information included in the metadata when the zoom mode information indicates that the automatic zooming mode is enabled for the zoom region.

2. The data processing method according to claim 1, wherein the automatic zooming mode is a director zoom mode corresponding to a rendition of the immersive media specified by a content producer of the immersive media.

3. The data processing method according to claim 1, wherein the zoom mode information includes a zoom flag that indicates whether the automatic zooming mode is enabled.

4. The data processing method according to claim 1, wherein when a value of the zoom ratio corresponding to one of the automatic zooming steps is an ineffective value, the zoom ratio indicates that a size of the zoom region of the immersive media after the corresponding automatic zooming step of the zoom processing associated with the zoom ratio is same as a size of the zoom region before the zoom processing is performed, and when the value of the zoom ratio is an effective value, the zoom ratio indicates that a ratio between the size of the zoom region of the immersive media after the corresponding automatic zooming step of the zoom processing associated with the zoom ratio is based on the value of the zoom ratio.

5. The data processing method according to claim 1, wherein the automatic zooming information comprises:

zoom duration units that indicate time units of the corresponding zoom durations for the automatic zooming steps.

6. The data processing method according to claim 1, further comprising:

obtaining a zoom description signaling file of the immersive media, the zoom description signaling file including description information of the zoom mode information, wherein the performing the zoom processing includes performing the zoom processing on the zoom region of the immersive media according to the zoom mode information included in the metadata and the description information of the zoom mode information in the zoom description signaling file.

7. The data processing method according to claim 6, wherein the zoom description signaling file includes at least one of a sphere region zooming descriptor or a two-dimensional (2D) region zooming descriptor, the sphere region zooming descriptor is encapsulated in a representation hierarchy in a media presentation description file of the immersive media, a quantity of sphere region zooming descriptors in the representation hierarchy being less than or equal to 1, and the 2D region zooming descriptor is encapsulated in the representation hierarchy in the media presentation description file of the immersive media, a quantity of 2D region zooming descriptors in the representation hierarchy being less than or equal to 1.

8. The data processing method according to claim 1, further comprising:

obtaining an encapsulated file of the immersive media, the encapsulated file including the metadata of the immersive media; and parsing the encapsulated file to obtain the metadata of the immersive media.

9. A data processing apparatus, comprising:

processing circuitry configured to:

obtain metadata of immersive media, the metadata including zoom region information indicating a zoom region of the immersive media and automatic zooming information associated with the zoom region, the automatic zooming information including;

zoom mode information indicating whether an automatic zooming mode is enabled for the zoom region, a step value indicating a number of automatic zooming steps to be sequentially performed when the automatic zooming mode is enabled, a respective zoom ratio for each of the automatic zooming steps, and a respective zoom duration for each of the automatic zooming steps;

obtain encoded data of the immersive media that corresponds to the zoom mode information when the zoom mode information included in the automatic zooming information indicates that the automatic zooming mode is enabled for the zoom region; and perform zoom processing sequentially on the zoom region of the immersive media during playback of the encoded data according to the automatic zooming information included in the metadata when the zoom mode information indicates that the automatic zooming mode is enabled for the zoom region.

10. The data processing apparatus according to claim 9, wherein the automatic zooming mode is a director zoom mode corresponding to a rendition of the immersive media specified by a content producer of the immersive media.

11. The data processing apparatus according to claim 9, wherein the processing circuitry is configured to:

obtain an encapsulated file of the immersive media, the encapsulated file including the metadata of the immersive media; and parse the encapsulated file to obtain the metadata of the immersive media.

12. A non-transitory computer readable storage medium, storing instructions which when executed by a processor cause the processor to perform:

obtaining metadata of an immersive media, the metadata including zoom region information indicating a zoom region of the immersive media and automatic zooming information associated with the zoom region, the automatic zooming information including:

zoom mode information indicating whether an automatic zooming mode is enabled for the zoom region, a step value indicating a number of automatic zooming steps to be sequentially performed when the automatic zooming mode is enabled, a respective zoom ratio for each of the automatic zooming steps, and a respective zoom duration for each of the automatic zooming steps;

obtaining, by processing circuitry, encoded data of the immersive media that corresponds to the zoom mode information when the zoom mode information included in the automatic zooming information indicates that the automatic zooming mode is enabled for the zoom region; and performing zoom processing sequentially on the zoom region of the immersive media during playback of the encoded data according to the automatic zooming information included in the metadata when the zoom mode information indicates that the automatic zooming mode is enabled for the zoom region.

13. The non-transitory computer readable storage medium according to claim 12, wherein the automatic zooming mode is a director zoom mode corresponding to a rendition of the immersive media specified by a content producer of the immersive media.

14. The non-transitory computer readable storage medium according to claim 12, wherein the zoom mode information includes a zoom flag that indicates whether the automatic zooming mode is enabled.

15. The non-transitory computer readable storage medium according to claim 12, wherein when a value of the zoom ratio corresponding to one of the automatic zooming steps is an ineffective value, the zoom ratio indicates that a size of the zoom region of the immersive media after the corresponding automatic zooming step of the zoom processing associated with the zoom ratio is same as a size of the zoom region before the zoom processing is performed, and when the value of the zoom ratio is an effective value, the zoom ratio indicates that a ratio between the size of the zoom region of the immersive media after the zoom step of the corresponding zoom processing associated with the zoom ratio is based on the value of the zoom ratio.

16. The non-transitory computer readable storage medium according to claim 12, wherein the automatic zooming information comprises:

zoom duration units that indicate time units of the corresponding zoom durations for the automatic zooming steps.

17. The non-transitory computer readable storage medium according to claim 12, wherein the instructions further cause the processor to perform:

obtaining a zoom description signaling file of the immersive media, the zoom description signaling file including description information of the zoom mode information, wherein the performing the zoom processing includes performing the zoom processing on the zoom region of the immersive media according to the zoom mode information included in the metadata and the description information of the zoom mode information in the zoom description signaling file.

18. The non-transitory computer readable storage medium according to claim 17, wherein the zoom description signaling file includes at least one of a sphere region zooming descriptor or a two-dimensional (2D) region zooming descriptor, the sphere region zooming descriptor is encapsulated in a representation hierarchy in a media presentation description file of the immersive media, a quantity of sphere region zooming descriptors in the representation hierarchy being less than or equal to 1, and the 2D region zooming descriptor is encapsulated in the representation hierarchy in the media presentation description file of the immersive media, a quantity of 2D region zooming descriptors in the representation hierarchy being less than or equal to 1.

19. The data processing method according to claim 8, wherein the obtaining the encoded data of the immersive media includes:

requesting, from a server, a video file of the immersive media at a current resolution version based on the automatic zooming information without requesting all video files of the immersive media of all resolution versions.

20. The data processing method according to claim 19, wherein the automatic zooming information includes zoom duration units that indicate time units of the corresponding zoom durations for the automatic zooming steps, and the zoom duration units include non-zero values in units of seconds.

* * * * *